(12) United States Patent
Li et al.

(10) Patent No.: US 12,703,522 B2
(45) Date of Patent: Aug. 11, 2026

(54) DUCTED FAN AERIAL VEHICLE

(71) Applicant: SZ DJI TECHNOLOGY CO., LTD., Shenzhen (CN)

(72) Inventors: Ang Li, Shenzhen (CN); Chao Ma, Shenzhen (CN); Qi Li, Shenzhen (CN); Wei Zhang, Shenzhen (CN); Xiaoyu Chen, Shenzhen (CN); Zhenhua Xu, Shenzhen (CN); Dong Li, Shenzhen (CN); Yiqing Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/020,781

(22) Filed: Jan. 14, 2025

(65) Prior Publication Data

US 2025/0178757 A1 Jun. 5, 2025

Related U.S. Application Data

(63) Continuation of application No. PCT/CN2022/114054, filed on Aug. 22, 2022.

(51) Int. Cl.
*B64U 30/26* (2023.01)
*B64U 10/14* (2023.01)
*B64U 20/80* (2023.01)

(52) U.S. Cl.
CPC ............. *B64U 30/26* (2023.01); *B64U 10/14* (2023.01); *B64U 20/80* (2023.01)

(58) Field of Classification Search
CPC ......... B64U 30/26; B64U 50/14; B64U 20/80
See application file for complete search history.

(56) References Cited

U.S. PATENT DOCUMENTS

| | | | | |
|---|---|---|---|---|
| 10,293,937 | B2 | 5/2019 | Welsh et al. | |
| 10,604,243 | B2 * | 3/2020 | Tian | B64U 10/13 |
| 10,946,958 | B2 * | 3/2021 | Baek | B64U 30/26 |
| 11,405,083 | B2 * | 8/2022 | Nilsson | H01Q 1/28 |
| 12,180,913 | B2 * | 12/2024 | Bernard | B64C 29/0016 |
| 2010/0140415 | A1 | 6/2010 | Goossen | |
| 2020/0288586 | A1 * | 9/2020 | Lu | H05K 5/0247 |
| 2023/0097186 | A1 * | 3/2023 | Johannesson | B64U 10/70 244/108 |

FOREIGN PATENT DOCUMENTS

| | | |
|---|---|---|
| CN | 108945418 A | 12/2018 |
| CN | 109533286 A | 3/2019 |
| CN | 109533287 A | 3/2019 |

(Continued)

OTHER PUBLICATIONS

The World Intellectual Property Organization (WIPO) International Search Report for PCT/CN2022/114054 May 8, 2023 4 Pages (including translation).

*Primary Examiner* — Timothy D Collins
(74) *Attorney, Agent, or Firm* — ANOVA LAW GROUP, PLLC

(57) ABSTRACT

A ducted fan aerial vehicle includes a duct, a vehicle body connected to the duct, and a power assembly connected to the vehicle body. The duct includes a duct unit including a duct hole. At least part of the duct unit is a hollow structure. The power assembly is at least partially located in the duct hole, and is configured to cooperate with the duct to provide aerodynamic thrust.

20 Claims, 26 Drawing Sheets

(56) References Cited

FOREIGN PATENT DOCUMENTS

| | | | | |
|---|---|---|---|---|
| CN | 210881561 U | | 6/2020 | |
| CN | 213262939 U | | 5/2021 | |
| CN | 213974450 U | | 8/2021 | |
| CN | 213974451 U | | 8/2021 | |
| CN | 114616177 A | | 6/2022 | |
| CN | 114802733 A | | 7/2022 | |
| DE | 102011117605 A1 | | 5/2013 | |
| KR | 20170135592 A | * | 12/2017 | ............ B64C 27/08 |
| KR | 101851322 B1 | | 4/2018 | |
| WO | 20210247621 A2 | | 12/2021 | |

* cited by examiner

DUCTED FAN AERIAL VEHICLE

CROSS-REFERENCE TO RELATED APPLICATION

This application is a continuation of International Application No. PCT/CN2022/114054, filed on Aug. 22, 2022, the entire content of which is incorporated herein by reference.

TECHNICAL FIELD

The present disclosure generally relates to the field of aerial vehicle technologies and, more particularly, to a ducted fan aerial vehicle.

BACKGROUND

A duct of a ducted fan aerial vehicle plays an important role in improving power efficiency of a power system, extending flight time and reducing noise. A weight of a duct in an existing ducted fan aerial vehicle is large, and the performance benefits brought by the duct are not enough to compensate for the flight range loss caused by the weight of the duct.

SUMMARY

In accordance with the disclosure, there is provided a ducted fan aerial vehicle including a duct, a vehicle body connected to the duct, and a power assembly connected to the vehicle body. The duct includes a duct unit including a duct hole. At least part of the duct unit is a hollow structure. The power assembly is at least partially located in the duct hole, and is configured to cooperate with the duct to provide aerodynamic thrust.

BRIEF DESCRIPTION OF THE DRAWINGS

To more clearly illustrate the technical solutions of the embodiments of the present disclosure, the drawings needed for describing the embodiments will be briefly introduced below. Obviously, the drawings described below are some embodiments of the present disclosure. For those skilled in the art, other drawings can be obtained based on these drawings without any creative work.

DETAILED DESCRIPTION OF THE EMBODIMENTS

The technical solutions in the embodiments of the present disclosure will be described clearly below in conjunction with the drawings in the embodiments of the present disclosure. Obviously, the described embodiments are part of the embodiments of the present disclosure, rather than all of the embodiments. Based on the embodiments in the present disclosure, all other embodiments obtained by those ordinally skilled in the art without creative work are within the scope of protection of the present disclosure.

Figure 1:
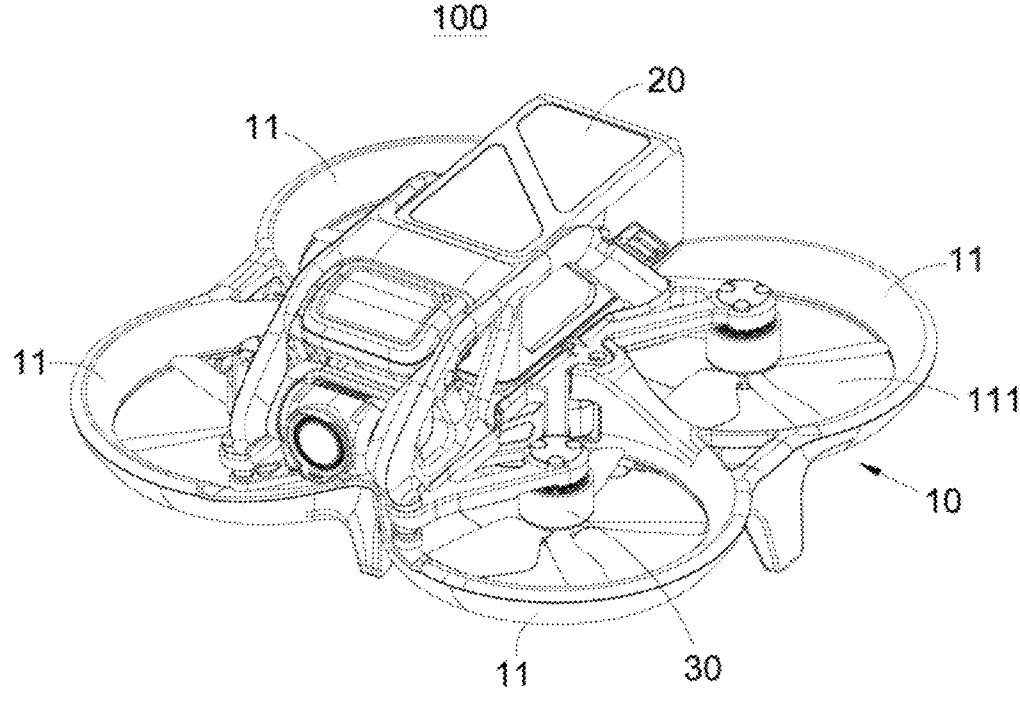
FIG. 1 is a schematic structural diagram of a ducted fan aerial vehicle from a first perspective provided by one embodiment of the present disclosure.

As shown in FIG. 1, one embodiment of the present disclosure provides a ducted fan aerial vehicle 100. The ducted fan aerial vehicle 100 may be a single-rotor ducted fan aerial vehicle, a two-rotor ducted fan aerial vehicle, or a multi-rotor ducted fan aerial vehicle with more than two rotors.

Figure 2:
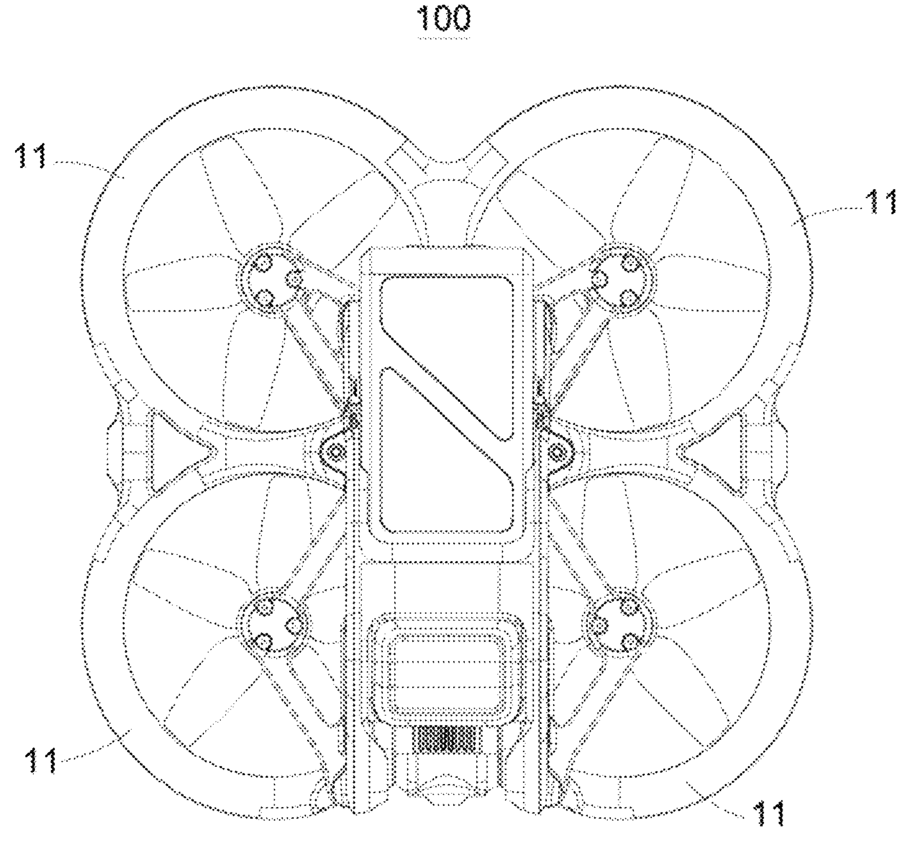
FIG. 2 is a schematic structural diagram of a ducted fan aerial vehicle from a second perspective provided by one embodiment of the present disclosure.

As shown in FIG. 1 and FIG. 2, in some embodiments, the proposed ducted fan aerial vehicle 100 includes a duct 10, a vehicle body 20, and a power assembly 30. The duct 10 includes at least two duct units 11. Each duct unit 11 includes a duct hole 111. The vehicle body 20 is connected to the duct 10. The power assembly 30 is connected to the vehicle body 20, and the power assembly 30 is at least partially located in the duct holes 111. The power assembly 30 may cooperate with the duct 10 to provide aerodynamic thrust. At least part of the duct unit 11 is a hollow structure.

In the ducted fan aerial vehicle 100 provided by the present disclosure, the weight of the duct 10 may be effectively reduced and the power efficiency of the system may be improved to extend the flight time, by setting at least part of the duct unit 11 to be a hollow structure. And, by setting a small portion of the power assembly 30 to be located in the duct holes 111, the cooperation of the power assembly 30 and the duct 10 may improve the aerodynamic performance of the ducted fan aerial vehicle 100. Further, the duct 10 may have a significant effect on reducing the noise of the power assembly 30.

Figure 3:
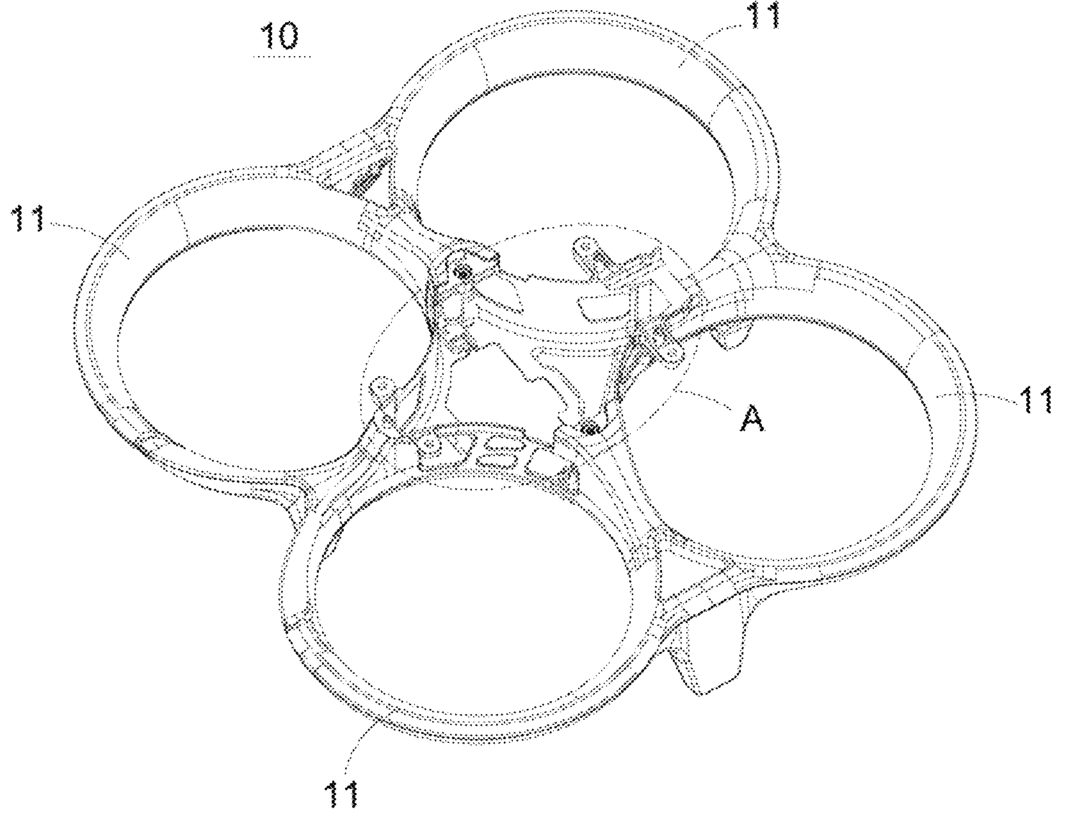
FIG. 3 is a schematic structural diagram of a duct provided by one embodiment of the present disclosure.
Figure 4:
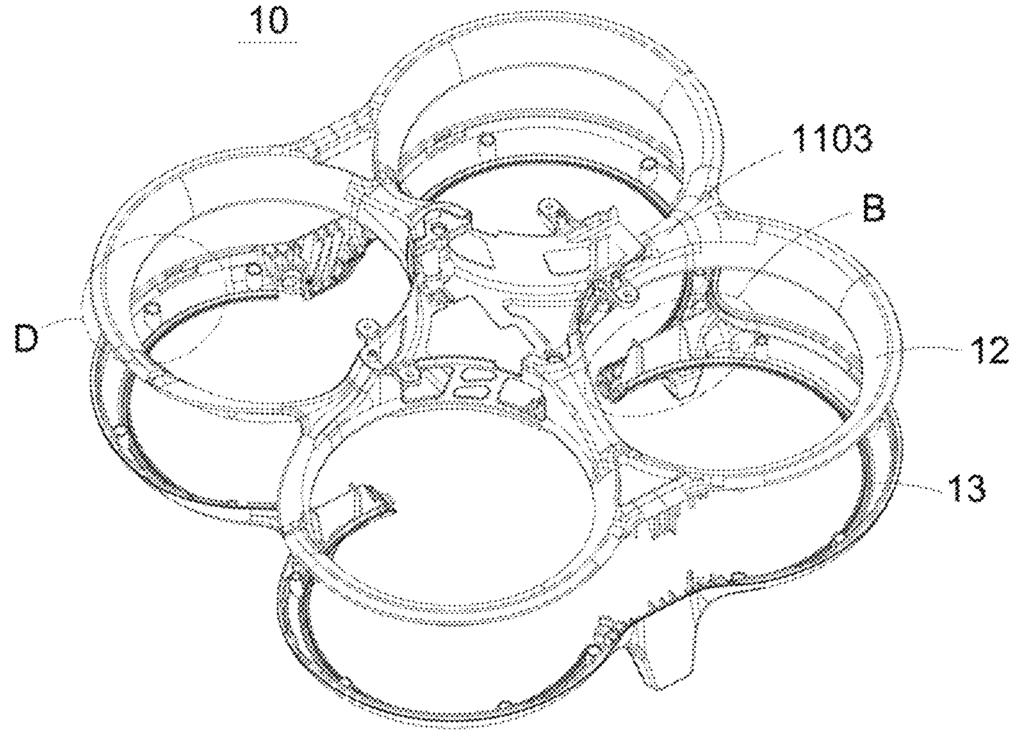
FIG. 4 is a schematic exploded diagram of a duct from a top perspective provided by one embodiment of the present disclosure.
Figure 5:
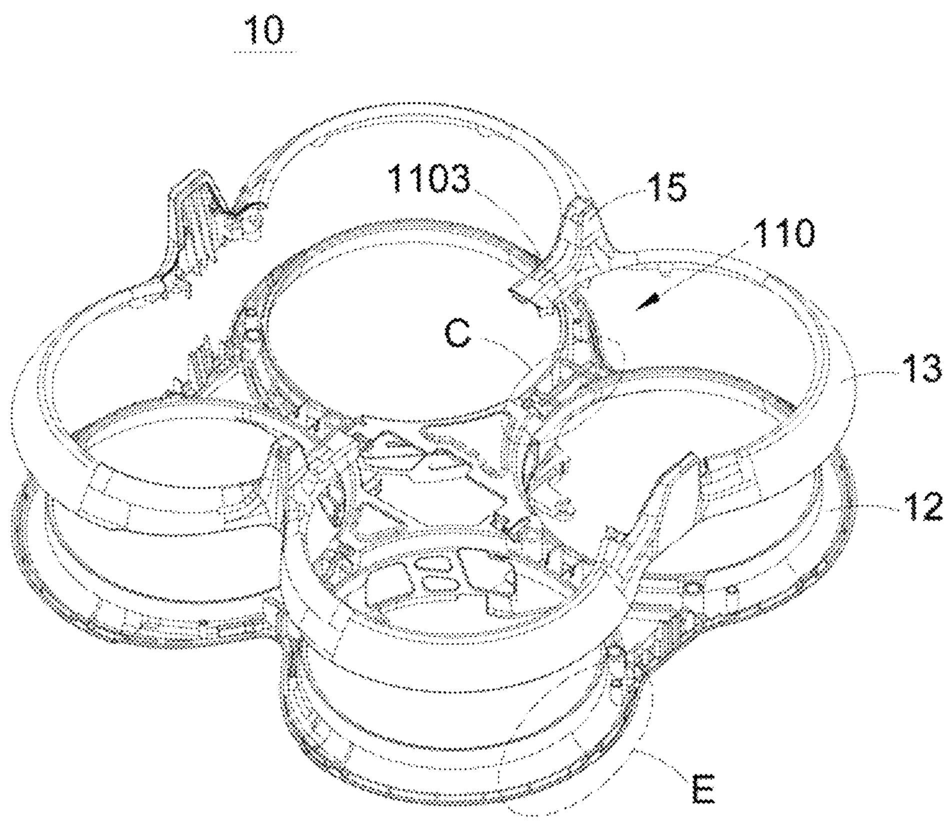
FIG. 5 is a schematic exploded diagram of a duct from a bottom perspective provided by one embodiment of the present disclosure.

As shown in FIG. 3 to FIG. 5, in some embodiments, the duct 10 includes a first duct structure 12 and a second duct structure 13. The first duct structure 12 and the second duct structure 13 are assembled to form the duct 10. In the actual production process, the first duct structure 12 and the second duct structure 13 may be separately molded in advance. The first duct structure 12 has a first recessed part, and the second duct structure 13 has a second recessed part. Then, the first duct structure 12 and the second duct structure 13 may be assembled to form the duct 10, and the first recessed part and the second recessed part may be combined to form the hollow structure. In this embodiment, the molding difficulty of the duct 10 may be reduced, mass production may be facilitated, and costs may be reduced. Optionally, the first duct structure 12 and the second duct structure 13 may be separately molded by injection molding or machining.

It should be noted that the duct 10 is not limited to the above-mentioned method of assembling the first duct structure 12 and the second duct structure 13 to realize that at least part of the duct unit 11 is a hollow structure. For example, in some other embodiments, the duct 10 and the hollow structure may also be formed at one time by 3D printing, that is, the formed duct 10 is a complete component and does not need to be assembled from multiple components.

In some embodiments, the first duct structure 12 and the second duct structure 13 may both be hard parts. In these embodiments, the duct 10 may have sufficient strength after molding, and may well maintain the shape of the duct 10, thereby maintaining its aerodynamic characteristics. Moreover, the hard duct 10 may be less deformed after being impacted, which may avoid the situation where the power assembly 30 is damaged because of the deformation of the duct 10 interfering with the blades of the power assembly 30.

In some other embodiments, the first duct structure 12 and the second duct structure 13 may both be plastic parts. Plastic has high strength and low weight, which reduces the weight of the duct 10 while ensuring the strength of the duct 10, thereby extending the flight time of the ducted fan aerial vehicle 100. Of course, the first duct structure 12 and the second duct structure 13 are not limited to plastic parts. For example, in some other embodiments, the first duct structure 12 and the second duct structure 13 may also be made of metal materials, wood materials or carbon fiber materials.

Figure 6:
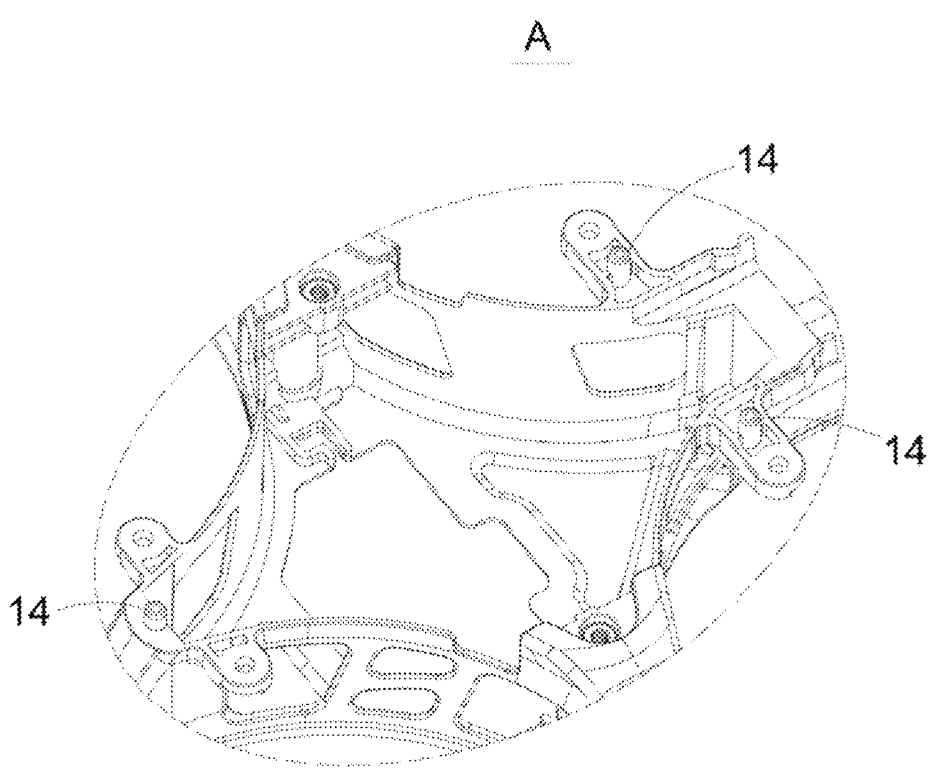
FIG. 6 is a partially enlarged schematic diagram of part A in FIG. 3.
Figure 7:
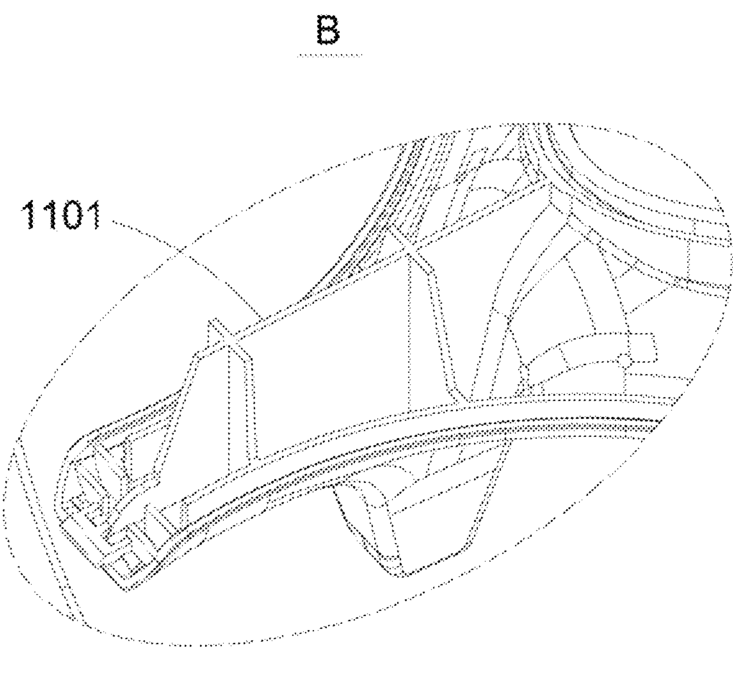
FIG. 7 is a partially enlarged schematic diagram of part B in FIG. 4.
Figure 8:
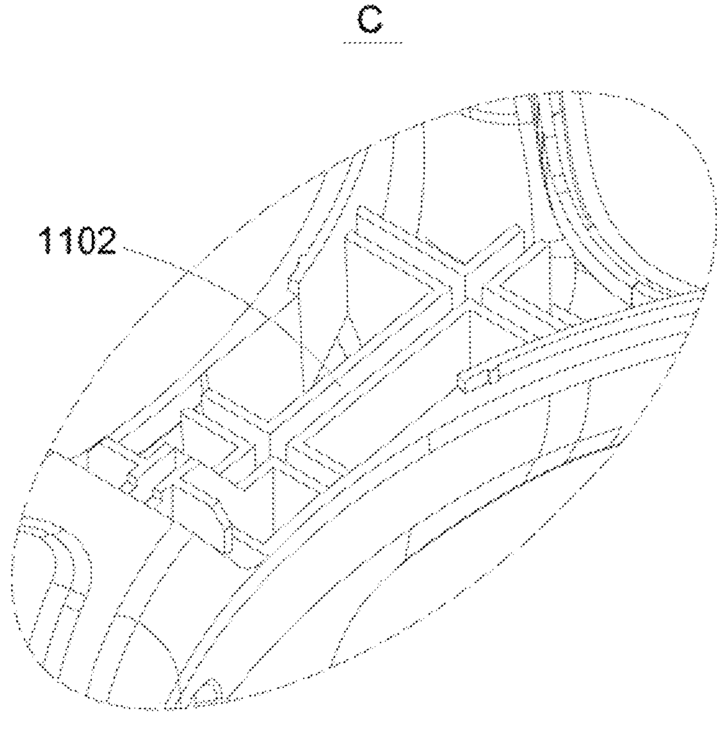
FIG. 8 is a partially enlarged schematic diagram of part C in FIG. 5.

As shown in FIG. 6, in some embodiments, the duct 10 is provided with first positioning members 14, and the vehicle body 20 is provided with second positioning members (not shown in the figure). The vehicle body 20 is installed at the duct 10 through the cooperation and positioning of the first positioning members 14 and the second positioning members. To fully utilize the aerodynamic performance of the duct 10, the distance between the blades of the power assembly 30 and the inner walls of the duct holes 111 may be generally very small, and the parts may be prone to errors during the manufacturing process and the assembly process. The errors in manufacturing and assembly may cause the distance between the blades of the power assembly 30 and the inner walls of the duct holes 111 to be too small or directly contact after the ducted fan aerial vehicle 100 is assembled, such that the blades may rub when the ducted fan aerial vehicle 100 is used. In the present embodiment, through the cooperation between the first positioning members 14 and the second positioning members, the vehicle body 20 may be accurately installed in the duct 10, such that the distance between the blades and the inner walls of the duct holes 111 may be well controlled to avoid the blade rubbing.

In some embodiments shown in FIG. 6, the ducted fan aerial vehicle 100 may include three first positioning members 14, and the three first positioning members 14 may be arranged in a triangular shape on the duct 10. In this embodiment, it can be known from the principle that the triangle has stability that, by setting the three first positioning members 14 in a triangular arrangement on the duct 10, the vehicle body 20 may be stably installed at the duct 10. Further, the triangular arrangement of the three first positioning members 14 may also improve the positioning accuracy, such that a higher assembly accuracy may be achieved between the vehicle body 20 and the duct 10, and indirectly avoid the interference between the power assembly 30 and the duct 10.

As shown in FIG. 6, for example, the first positioning members 14 may be positioning shafts provided at the duct 10, and the second positioning members may be shaft holes provided at the vehicle body 20. The positioning shafts may pass through the shaft holes to achieve the positioning and installation of the duct 10 and the vehicle body 20. Of course, in the present disclosure, the first positioning members 14 and the second positioning members are not limited to the cooperation mode of the positioning shafts and the shaft holes. In some other embodiments, the first positioning members 14 and the second positioning members may adopt the cooperation mode of the protrusions and the grooves, which may be determined according to the actual design needs.

As shown in FIG. 3 to FIG. 5 and FIG. 7 to FIG. 8, in some embodiments, the at least two duct units 11 form a surrounding distribution structure, two adjacent duct units 11 are connected to each other, and a first reinforcement structure 110 is provided at the connection of at least two of the duct units 11. The surrounding distribution structure refers to that the at least two duct units 11 are distributed around a certain component or a certain area, and the duct units 11 may be connected or not connected, and this definition is used below. In this embodiment, by providing the first reinforcement structure 110 at the connection of the at least two duct units 11, the first reinforcement structure 110 may play a role in strengthening the strength of the duct 10, which reduces the likelihood of the duct 10 deforming to interfere with the blades of the power assembly 30 that causes damage or damage to the power assembly 30.

In some embodiments, the duct 10 may include four duct units 11, and the four duct units 11 may be connected in pairs to form a surrounding distribution structure. The four duct units 11 form four connection positions, and the first reinforcement structure 110 may be provided at two opposite connection positions. Of course, in some other embodiments, it may be also possible to provide the first reinforcement structure 110 at all four connection positions, which may be determined according to actual design needs.

In some embodiments, the duct 10 may include a skid 15. The first reinforcement structure 110 may be arranged close to the skid 15. In actual use, after the ducted fan aerial vehicle 100 completes each flight, during the landing process, the skid 15 of the duct 10 may have a collision process with the ground, and the impact force transmitted between the first duct structure 12 and the second duct structure 13 may cause the first duct structure 12 and the second duct structure 13 to separate. In this embodiment, by arranging the first reinforcement structure 110 close to the skid 15, the first reinforcement structure 110 may disperse the impact force transmitted by the skid 15, thereby avoiding the separation of the first duct structure 12 and the second duct structure 13.

In some embodiments, the skid 15 may extend from a junction of two adjacent duct units 11 and away from the center of the duct 10. In this embodiment, the skid 15 may be far away from the center of the duct 10, which is conducive to improving the landing stability of the ducted fan aerial vehicle 100.

In some embodiments, the first reinforcement structure 110 may include a reinforcement rib 1101 and an embedding groove 1102. The reinforcement rib 1101 may be arranged at one of the first duct structure 12 and the second duct structure 13, and the embedding groove 1102 may be arranged at another one of the first duct structure 12 and the second duct structure 13, where the reinforcement rib 1101 is embedded in the embedding groove 1102. Optionally, in one embodiment, the reinforcement rib 1101 may be integrally formed with the first duct structure 12 or the second duct structure 13.

In some embodiments, an adhesive may be arranged at the embedding groove 1102, and the reinforcement rib 1101 may be bonded and fixed to the inner side wall of the embedding groove 1102 by the adhesive. In this embodiment, the adhesive may improve the bonding force between the reinforcement rib 1101 and the inner side wall of the embedding groove 1102. Therefore, the first duct structure 12 and the second duct structure 13 may be more firmly combined and have better stability.

In some embodiments, the first reinforcement structure 110 may also include an arch member 1103, and the arch member 1103 may be connected with two adjacent duct units 11. Exemplarily, the duct 10 may include a top side and a bottom side, and the vehicle body 20 may be installed at the top side of the duct 10. The arch member 1103 may be arranged on the top side of the two adjacent duct units 11, or it may be arranged on the bottom side of the two adjacent duct units 11, or the top side and the bottom side of the two adjacent duct units 11. In one embodiment, for example, the arch member 1103 may be provided at the top side of the two adjacent duct units 11, and the arch member 1103 may be curved upward from one duct unit 11 and then may be connected to the adjacent duct unit 11.

It should be noted that the first reinforcement structure 110 is not limited to the above-mentioned arrangement. For example, in some other embodiments, only the first duct structure 12 or only the second duct structure 13 may be provided with the first reinforcement structure 110. In this embodiment, the first reinforcement structure 110 may be a reinforcement rib 1101 and/or an arch member 1103 provided at the first duct structure 12, or a reinforcement rib 1101 and/or an arch member 1103 provided at the second duct structure 13.

It should also be noted that, the duct 10 may be formed by 3D printing. In this embodiment, the first reinforcement structure 110 may be a reinforcement rib 1101 and/or an arch member 1103 directly formed by 3D printing between the two adjacent duct units 11.

Figure 9:
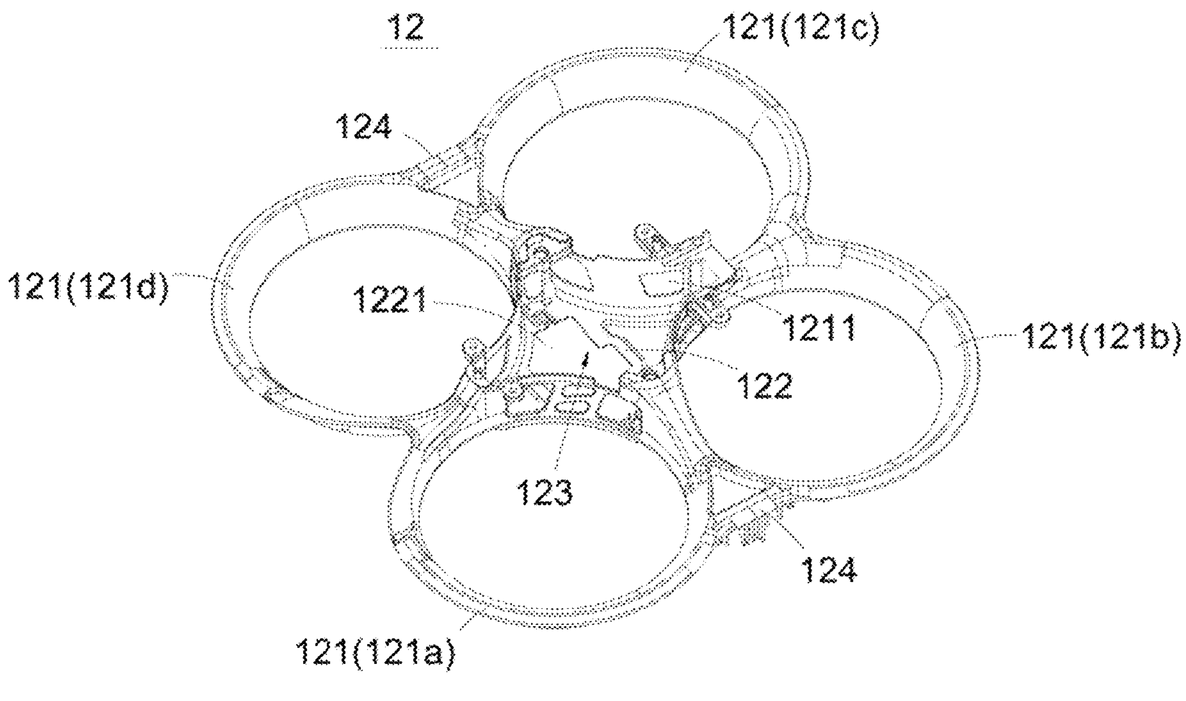
FIG. 9 is a schematic structural diagram of a first duct structure provided by one embodiment of the present disclosure.
Figure 10:
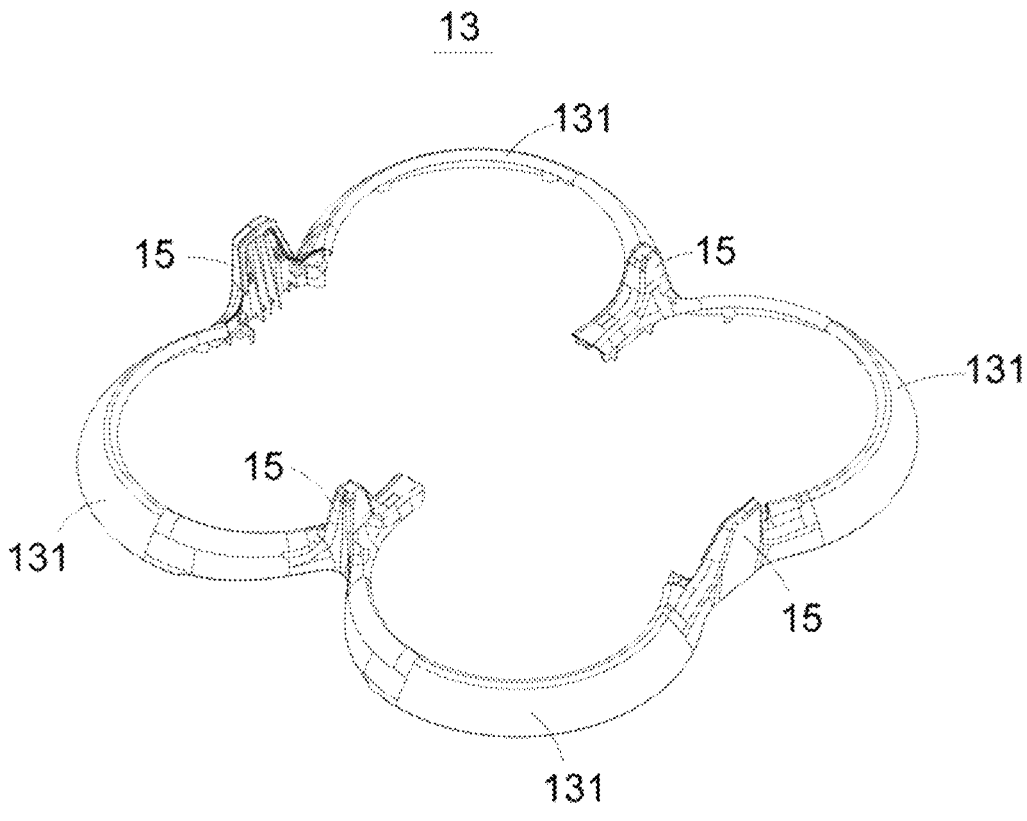
FIG. 10 is a schematic structural diagram of a second duct structure provided by one embodiment of the present disclosure.
Figure 11:
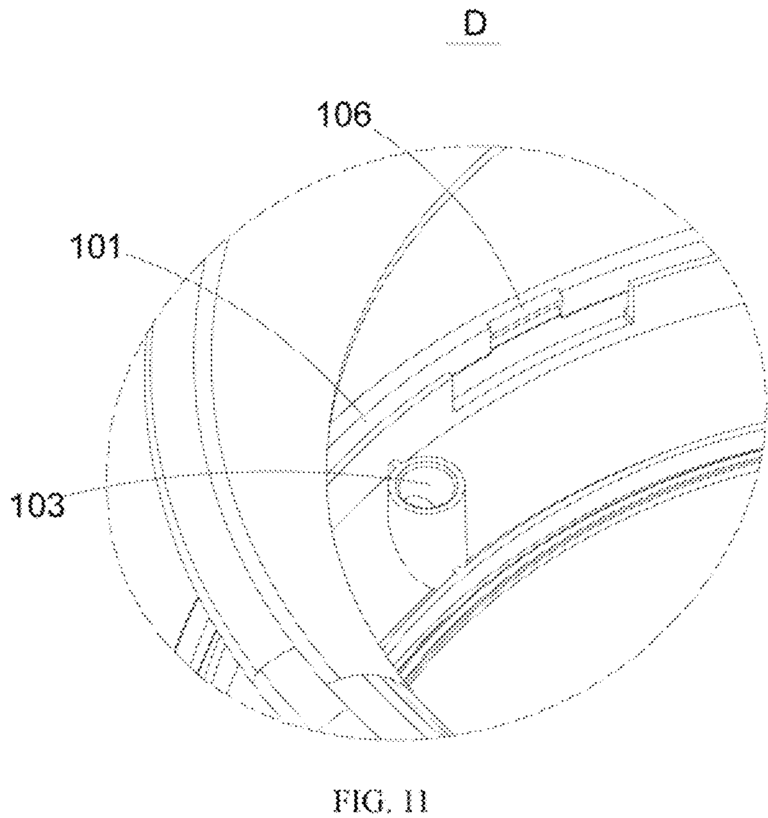
FIG. 11 is a partially enlarged schematic diagram of part D in FIG. 4.

As shown in FIG. 9 and FIG. 10, in some embodiments, the first duct structure 12 includes at least two duct inner rings 121. The at least two duct inner rings 121 may form the inner side walls of the duct units 11. The second duct structure 13 may include at least two duct outer rings 131, and the at least two duct outer rings 131 may form the outer side walls of the duct units 11. The duct inner rings 121 and the duct outer rings 131 may be assembled to form the duct units 11. During assembly, operators may align the duct inner rings 121 of the first duct structure 12 with the duct outer rings 131 of the second duct structure 13 one by one, and then assemble the first duct structure 12 and the second duct structure 13 together, where the first duct structure 12 and the second duct structure 13 are combined to form the duct 10. One duct inner ring 121 and one corresponding duct outer ring 131 may be combined to form one corresponding duct unit 11.

Of course, the first duct structure 12 and the second duct structure 13 are not limited to being split into the duct inner rings 121 and the duct outer rings 131. For example, in some other embodiments, the first duct structure 12 and the second duct structure 13 may also be split into the upper half and the lower half of the duct 10, which may be determined according to actual design needs.

In some embodiments, the at least two duct inner rings 121 may form a surrounding distribution structure, and each duct inner ring 121 may be an annular closed structure. The first duct structure 12 may also include a second reinforcement structure 122 arranged at the middle of the surrounding distribution structure and connected to the at least two duct inner rings 121. In this embodiment, by setting each duct inner ring 121 as an annular closed structure, the annular closed structure may have better integrity and may not be easy to deform. Moreover, by setting the second reinforcement structure 122, the strength of the first duct structure 12 may be further improved, such that the duct inner rings 121 are not easy to deform. Optionally, each duct inner ring 121 may be, but is not limited to, a circular ring structure.

As shown in FIG. 9, in some embodiments, the first duct structure 12 includes four duct inner rings 121, namely, the first duct inner ring 121*a*, the second duct inner ring 121*b*, the third duct inner ring 121*c* and the fourth duct inner ring 121*d*. The first duct inner ring 121*a*, the second duct inner ring 121*b*, the third duct inner ring 121*c* and the fourth duct inner ring 121*d* may be connected in pairs to form a surrounding distribution structure. The second reinforcement structure 122 may be arranged at the area enclosed by the four duct inner rings 121. Optionally, in one embodiment, the second reinforcement structure 122 may be connected to all four duct inner rings 121.

In some embodiments, the second reinforcement structure 122 may be integrally formed with the duct inner rings 121. In this embodiment, the strength of the whole structure formed by the second reinforcement structure 122 and the duct inner rings 121 may be improved. Of course, the second reinforcement structure 122 and the duct inner rings 121 are not limited to being integrally formed. For example, in some other embodiments, the second reinforcement structure 122 and the duct inner rings 121 may be detachably connected.

As shown in FIG. 9, in some embodiments, the second reinforcement structure 122 and the duct inner rings 121 may enclose a concave cavity 123, and the concave cavity 123 may be used to accommodate the avionics module and/or power module of the ducted fan aerial vehicle 100. In this embodiment, the space of the duct 10 may be reasonably utilized, which is conducive to reducing the overall size of the ducted fan aerial vehicle 100.

As shown in FIG. 9, in some embodiments, the duct inner rings 121 may be provided with a vent 1211 connected to the concave cavity 123. In this embodiment, the airflow generated by the propellers of the power assembly 30 during rotation may enter the concave cavity 123 through the vent 1211, which plays a role in heat dissipation for the avionics module and/or power module located inside the concave cavity 123. This structure may cleverly utilize the existing structure, and there may be no need to add a heat dissipation mechanism, which not only simplifies the mechanism but also reduces the cost.

As shown in FIG. 9, in some embodiments, the second reinforcement structure 122 may be provided with a hollow structure 1221. In this embodiment, the hollow structure 1221 may reduce the weight of the duct 10, reduce energy consumption, and increase the endurance of the ducted fan aerial vehicle 100. Further, the hollow structure 1221 may be conducive to the circulation of air inside the concave cavity 123, which may accelerate the heat dissipation of the avionics module and/or the power module.

As shown in FIG. 9, in some embodiments, the duct 10 may also include a third reinforcement structure 124. The third reinforcement structure 124 may be provided at the edge of the surrounding distribution structure and connect the outer side walls of the two adjacent duct units 11. In this embodiment, by providing the third reinforcement structure 124 to form a connecting bridge between the two adjacent duct units 11, the overall strength of the duct 10 may be improved, making the duct 10 less likely to deform.

In some embodiments, the duct 10 may include four duct units 11, namely, a first duct unit, a second duct unit, a third duct unit, and a fourth duct unit. The first duct unit, the second duct unit, the third duct unit, and the fourth duct unit may be connected in pairs to form a surrounding distribution structure. The duct 10 may include two third reinforcement structures 124. One of third reinforcement structures 124 may be connected to the outer sides of the first duct unit and the second duct unit, and the other of the third reinforcement structures 124 may be connected to the outer sides of the third duct unit and the fourth duct unit. Of course, it is also possible to provide a third reinforcement structure 124 between the first duct unit and the fourth duct unit and/or between the second duct unit and the third duct unit, which may be determined according to actual design needs.

In some embodiments, the third reinforcement structure 124 may be provided at the edge of the surrounding distribution structure and connect two adjacent duct inner rings 121, that is, the first duct structure 12 may be provided with a third reinforcement structure 124. In this embodiment, by providing the third reinforcement structure 124, the strength of the first duct structure 12 may be improved, such that the duct inner ring 121 is not easily deformed. In some other embodiments, the third reinforcement structure 124 may also be arranged at the second duct structure 13, which may be determined according to actual design requirements.

As shown in FIG. 9, in some embodiments, the first duct structure 12 may include four duct inner rings 121, namely the first duct inner ring 121*a*, the second duct inner ring 121*b*, the third duct inner ring 121*c* and the fourth duct inner ring 121*d*. The first duct inner ring 121*a*, the second duct inner ring 121*b*, the third duct inner ring 121*c* and the fourth duct inner ring 121*d* may be connected in pairs to form a surrounding distribution structure. The duct 10 may include two third reinforcement structures 124. One of third reinforcement structures 124 may connect the first duct inner ring 121*a* and the second duct inner ring 121*b*, and the other one of the third reinforcement structures 124 may connect the third duct inner ring 121*c* and the fourth duct inner ring 121*d*.

As shown in FIG. 10, in some embodiments, the duct 10 includes a skid 15, and the third reinforcement structure 124 is provided at the skid 15. In actual use, the ducted fan aerial vehicle 100 needs to land after each flight. During the landing process, the skid 15 of the duct 10 may have a collision process with the ground. In this embodiment, by arranging the third reinforcement structure 124 close to the skid 15, the third reinforcement structure 124 may disperse the impact force transmitted by the skid 15, thereby avoiding damage to the duct 10.

As shown in FIG. 9, in some embodiments, the third reinforcement structure 124 may be integrally formed with the duct inner rings 121. In this embodiment, the strength of the whole structure formed by the third reinforcement structure 124 and the duct inner rings 121 may be improved. Of course, the third reinforcement structure 124 and the duct inner rings 121 are not limited to being integrally formed. For example, in some other embodiments, the third reinforcement structure 124 and the duct inner rings 121 may be detachably connected.

As shown in FIG. 10, in some embodiments, at least two duct outer rings 131 form a surrounding distribution structure. Each duct outer ring 131 may be an arc structure, and the ends of two adjacent duct outer rings 131 may be connected to each other. Exemplarily, the second duct structure 13 may include four duct outer rings 131, and the four duct outer rings 131 may be connected in pairs to form a surrounding distribution structure. Optionally, each duct outer ring 131 may be, but is not limited, to an arc structure.

As shown in FIG. 10, in some embodiments, the skid 15 may be provided at the connection of the two adjacent duct outer rings 131. The connection of the two duct outer rings 131 may have a high strength and may better disperse the impact force transmitted by the skid 15.

As shown in FIG. 10, in some embodiments, the duct 10 may include four duct outer rings 131, and also include four skids 15. A connection of every two duct outer rings 131 may be provided with one skid 15.

As shown in FIG. 10, in some embodiments, the skid 15 is integrally formed with the duct outer rings 131. In this embodiment, the strength of the whole structure formed by the skid 15 and the duct outer rings 131 may be improved.

As shown in FIGS. 4, 5, 11, 12 and 13, in some embodiments, one of one duct inner ring 121 and one corresponding duct outer ring 131 may be provided with an assembly groove 101, and the other of the duct inner ring 121 and the corresponding duct outer ring 131 may be provided with an assembly member 102. The assembly member 102 may be embedded in the assembly groove 101. In this embodiment, by providing the assembly member 102 and the assembly groove 101 to cooperate, the bonding strength between the duct inner rings 121 and the corresponding duct outer rings 131 may be improved, such that the duct inner ring 121 and the corresponding duct outer ring 131 are not easy to fall off from each other after being assembled.

In some embodiments, an adhesive may be provided in the assembly groove 101, and the assembly member 102 may be bonded and fixed to the inner side wall of the assembly groove 101 by the adhesive. In this embodiment, the adhesive may improve the bonding force between the assembly member 102 and the inner side wall of the assembly groove 101, such that the duct inner ring 121 and the corresponding duct outer ring 131 may be more firmly bonded.

Figure 12:
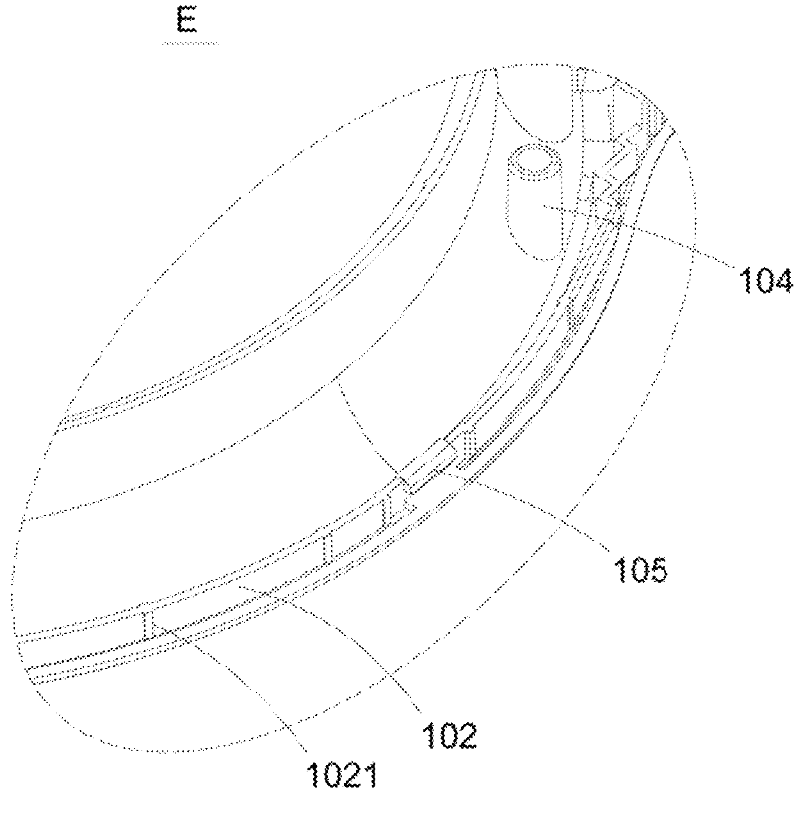
FIG. 12 is a partially enlarged schematic diagram of part E in FIG. 5.

As shown in FIG. 12, in some embodiments, the assembly member 102 may be provided with a positioning boss 1021 on one or two sides in the thickness direction thereof. In this embodiment, after the assembly member 102 is inserted into the assembly groove 101, the positioning boss 1021 may abut against the inner side wall of the assembly groove 101, thereby reducing the gap between the assembly member 102 and the inner side wall of the assembly groove 101 as much as possible, improving the installation accuracy between the duct inner ring 121 and the duct outer ring 131, and avoiding the interference between the duct inner ring 121 and the propellers of the power assembly 30 after the ducted fan aerial vehicle 100 is assembled. It could be understood that, when there is a gap between the assembly member 102 and the inner side wall of the assembly groove 101, the gap may make it possible for the duct inner ring 121 and the duct outer ring 131 to be deformed. Since the gap between the inner side wall of the duct holes 111 and the blades is small, the deformed duct inner ring 121 may be prone to cause the duct 10 to interfere with the blades of the power assembly 30.

Figure 13:
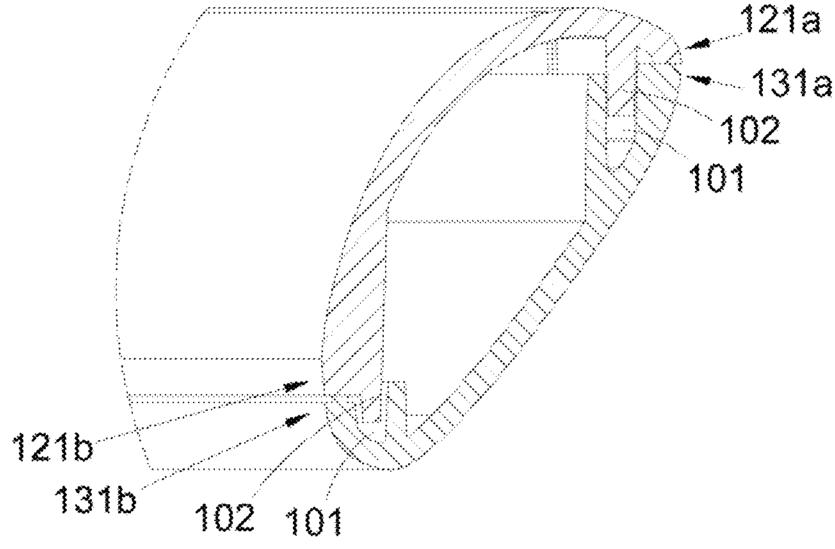
FIG. 13 is a schematic cross-sectional diagram of a duct unit provided by one embodiment of the present disclosure.
Figure 14:
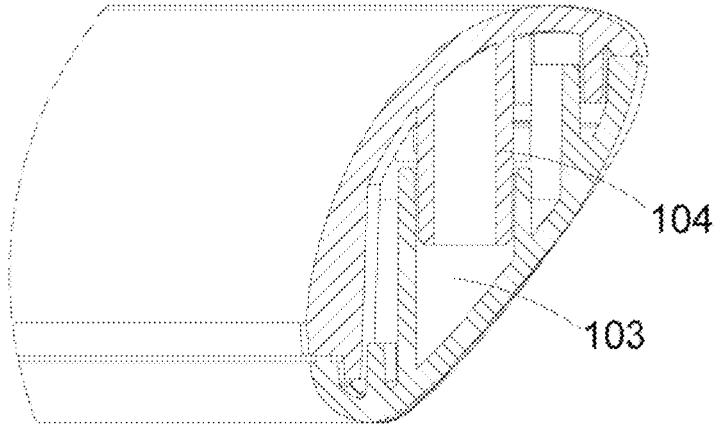
FIG. 14 is a schematic cross-sectional diagram of a duct unit provided by one embodiment of the present disclosure.
Figure 15:
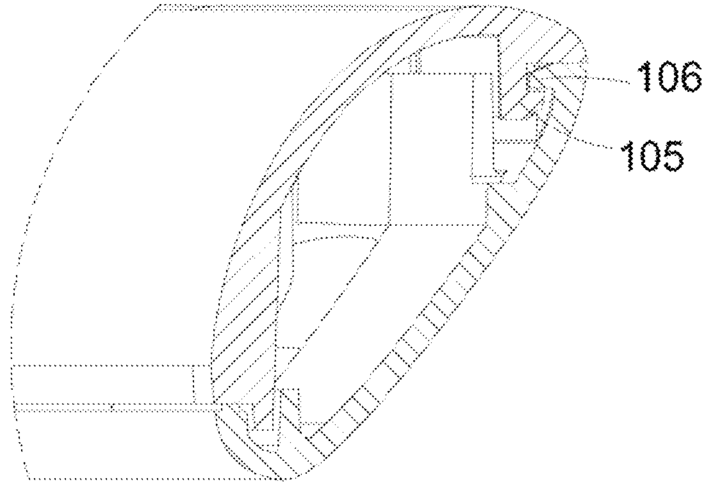
FIG. 15 is a schematic cross-sectional diagram of a duct unit provided by one embodiment of the present disclosure.

As shown in FIG. 13, in some embodiments, one duct inner ring 121 may include a first edge 121*a* and a second edge 121*b* opposite to the first edge 121*a*, and one corresponding duct outer ring 131 may include a third edge 131*a* and a fourth edge 131*b* opposite to the third edge 131*a*. The first edge 121*a* may abut and be connected with the third edge 131*a*, and the second edge 121*b* may abut against and be connected with the fourth edge 131*b*. A matching structure of an assembly groove 101 and an assembly member 102 may be provided near the first edge 121*a* and the third edge 131*a*, and near the second edge 121*b* and the fourth edge 131*b*. In this embodiment, by providing the matching structure of the assembly groove 101 and the assembly member 102 at two matching locations of the duct inner ring 121 and the corresponding duct outer ring 131, the bonding strength of the duct inner ring 121 and the corresponding duct outer ring 131 may be improved. Of course, in some other embodiments, the matching structure of the assembly groove 101 and the assembly part 102 may be arranged only near the first edge 121*a* and the third edge 131*a*, or only near the second edge 121*b* and the fourth edge 131*b*.

As shown in FIGS. 4, 5, 11, 12 and 14, in some embodiments, one of the duct inner ring 121 and the corresponding duct outer ring 131 may be provided with a guide hole 103, and the other of the duct inner ring 121 and the corresponding duct outer ring 131 may be provided with a guide column 104. The guide column 104 may be inserted in the guide hole 103. In this embodiment, on the one hand, the matching of the guide column 104 and the guide hole 103 may reduce the difficulty of assembling the duct inner ring 121 and the corresponding duct outer ring 131. During installation, the operator may align the guide column 104 with the guide hole 103, and then press the duct inner ring 121 and the corresponding duct outer ring 131 together, without aligning the assembly groove 101 with the assembly member 102. On the other hand, the cooperation between the guide column 104 and the guide hole 103 may improve the bonding strength between the duct inner ring 121 and the duct outer ring 131, and reduce the separation of the duct inner ring 121 and the duct outer ring 131 when the duct 10 is hit.

As shown in FIGS. 4, 5, 11, 12 and 15, in some embodiments, one of the duct inner ring 121 and the corresponding duct outer ring 131 is provided with a first snap member 105, and the other of the duct inner ring 121 and the duct outer ring 131 is provided with a second snap member 106. The first snap member 105 may be snapped with the second snap member 106. During the actual assembly process of the duct inner ring 121 and the duct outer ring 131, the operator may first inject adhesive into the assembly groove 101, align the guide column 104 with the guide hole 103, and press the duct inner ring 121 and the duct outer ring 131 such that the assembly member is embedded in the assembly groove 101. Subsequently, the duct 10 that has just been assembled may be transferred to the jig for fixation. During this process, the adhesive may not yet solidify and there may be assembly stress between the duct inner ring 121 and the duct outer ring 131. Therefore, during the process of transferring the duct 10 that has just been assembled to the jig for fixation, the duct inner ring 121 and the duct outer ring 131 may be separated from each other. In this embodiment, by the cooperation of the first snap member 105 and the second snap member 106, it may be possible to prevent the duct inner ring 121 and the duct outer ring 131 from being separated from each other during the process of transferring the duct 10 that has just been assembled to the jig for fixation.

Figure 16:
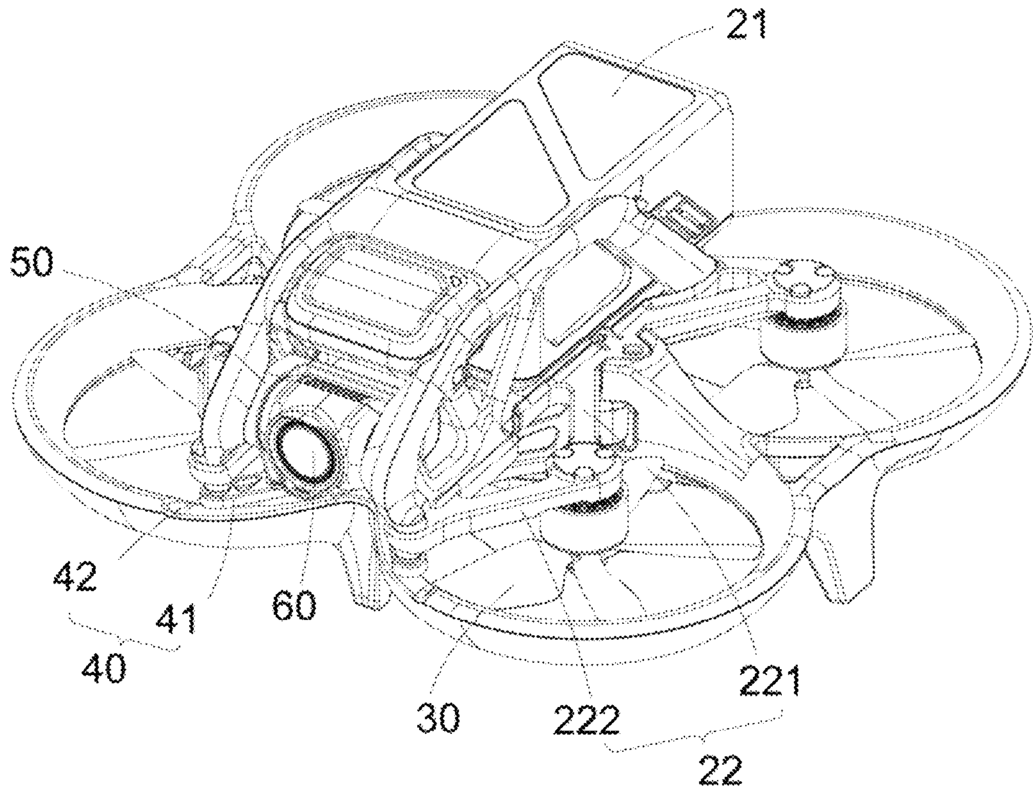
FIG. 16 is a schematic structural diagram of a ducted fan aerial vehicle from a first perspective provided by one embodiment of the present disclosure.

As shown in FIG. 16, in some embodiments, the vehicle body 20 may include a vehicle main body 21 and arms 22, where the arms 22 may connect the vehicle main body 21 and the power assembly 30. One arm 22 may include a first support arm 221 and a second support arm 222. The first support arm 221 and the second support arm 222 may extend outward from the vehicle main body 21 and may be connected, such that the first support arm 221, the second support arm 222 and a part of the vehicle main body 21 together enclose a triangle. The power assembly 30 may be installed at the connection between the first support arm 221 and the second support arm 222. In this embodiment, according to the principle that a triangle has stability, the triangular structure of the first support arm 221, the second support arm 222 and a part of the vehicle main body 21 may improve the strength and stability of the arm 22, and avoid deformation of the arm 22 during use of the ducted fan aerial vehicle 100 causing interference between the blades of the power assembly 30 and the inner wall of the duct holes 111. Further, the triangular structure of the first support arm 221, the second support arm 222 and part of the vehicle main body 21 may also improve the positioning accuracy of the arm 22, that is, improve the positioning accuracy when the power assembly 30 is installed at the arm 22, thereby avoiding the interference between the power assembly 30 and the duct 10.

Figure 17:
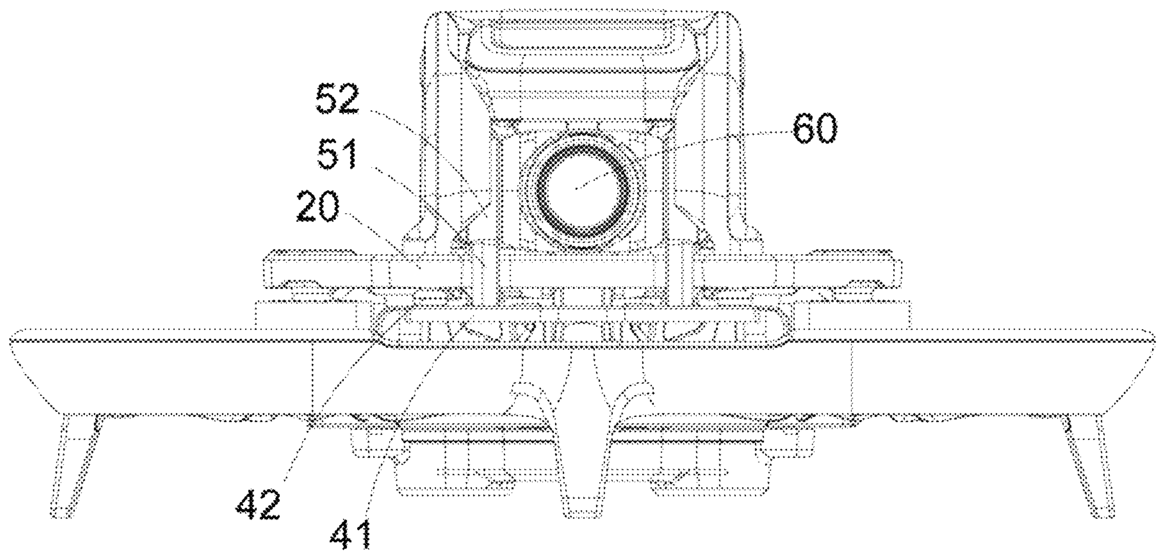
FIG. 17 is a schematic structural diagram of a ducted fan aerial vehicle from a third perspective provided by one embodiment of the present disclosure.

As shown in FIG. 16 and FIG. 17, in some embodiments, the ducted fan aerial vehicle 100 may further include a shock absorption mechanism 40, a gimbal 50 and a camera device 60. The shock absorption mechanism 40 may be connected to the vehicle body 20, the gimbal 50 may be connected to the shock absorption mechanism 40, and the camera device 60 may be connected to the gimbal 50. The shock absorption mechanism 40 may be arranged below the camera device 60. In this embodiment, by providing the shock absorption mechanism 40, the vibration transmitted from the vehicle body 20 to the camera device 60 may be weakened, and the imaging quality of the camera device 60 may be improved. Moreover, by arranging the shock absorption mechanism 40 below the camera device 60, the structure of the ducted fan aerial vehicle 100 may be more compact, reducing the volume of the ducted fan aerial vehicle 100 to reduce wind resistance. By arranging the shock absorption mechanism 40 below the camera device 60, the camera device 60 may be accommodated at the front end of the vehicle body 20, such that the camera device 60 and the vehicle body 20 have better integrity. It can be understood that, when the shock absorption mechanism 40 is arranged above the camera device 60, the vehicle body 20 is connected to the shock absorption mechanism 40, and the shock absorption mechanism 40 is further connected to the camera device 60, causing the camera device 60 to extend to the bottom of the ducted fan aerial vehicle 100 to increase the overall volume of the ducted fan aerial vehicle 100 and the wind resistance.

In some embodiments, the shock absorption mechanism 40 may include a connection member 41 and a shock absorption member 42. The connection member 41 may be connected to the gimbal 50, and the shock absorption member 42 may connect the connection member 41 and the vehicle body 20.

In some embodiments, the shock absorption member 42 may include shock absorber balls, and the number of the shock absorber balls may be three. The three shock absorber balls may be arranged in a triangle. In this embodiment, while simplifying the shock absorption mechanism 40, the three shock absorber balls arranged in a triangle may form a plane shock absorption, which has a better shock absorption effect. Of course, the shock absorption member 42 is not limited to the shock absorber balls. For example, in some other embodiments, the shock absorption member may include a spring, a spring sheet, a plastic part or other elastic component, which may be determined according to actual design needs.

As shown in FIG. 17, in some embodiments, the gimbal 50 may include a gimbal bracket 51 and a motor 52, where the motor 52 is installed at the gimbal bracket 51 and connected to the camera device 60. The gimbal bracket 51 and the connection member 41 may be integrally formed. In this embodiment, by setting the gimbal bracket 51 and the connection member 41 to be integrally formed, not only may the assembly process be reduced and the assembly difficulty between the gimbal 50 and the shock absorption mechanism 40 be reduced, but also the connection strength between the gimbal 50 and the shock absorption mechanism 40 may be increased.

In some embodiments, the gimbal bracket 51 may be tilted at a preset angle relative to the connection member 41 to avoid blocking the field of view of the camera device 60. Optionally, the gimbal bracket 51 may be tilted relative to the connection member 41 toward the rear side of the ducted fan aerial vehicle 100.

Figure 18:
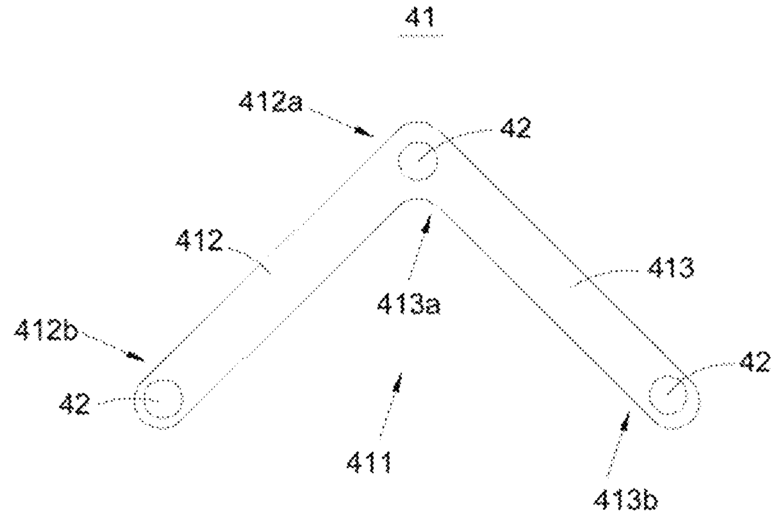
FIG. 18 is a schematic structural diagram of a connector provided by one embodiment of the present disclosure.

As shown in FIG. 18, in some embodiments, the motor 52 may be used to drive the camera device 60 to perform a pitching action, and a side of the connection member 41 facing the forward direction of the ducted fan aerial vehicle 100 may be provided with an avoidance gap 411. The avoidance gap 411 may allow the connection member 41 to avoid the field of view of the camera device 60 when the camera device 60 looks down to the extreme position, to avoid blocking the field of view of the camera device 60.

As shown in FIG. 18, in some embodiments, the connection member 41 may include a first extension 412 and a second extension 413, and the second extension 413 and the first extension 412 may be arranged in a V shape. The first extension 412 and the second extension 413 may enclose the avoidance gap 411. In this embodiment, the connection member 41 may use less material and have a low weight, which may reduce energy consumption. Of course, the connection member 41 is not limited to the above-mentioned setting mode. For example, in some other embodiments, the connection member 41 may be set to a plate shape, as long as the connection member 41 is provided with the avoidance gap 411 to avoid blocking the field of view of the camera device 60.

As shown in FIG. 18, in some embodiments, the first extension 412 may include a first connection end 412*a* and a first free end 412*b*, the second extension 413 includes a second connection end 413*a* and a second free end 413*b*, and the first connection end 412*a* is connected to the second connection end 413*a*. One of the three shock absorber balls may be provided at the first free end 412*b*, another of the three shock absorber balls may be provided at the second free end 413*b*, and another of the three shock absorber balls may be provided at the connection between the first connection end 412*a* and the second connection end 413*a*.

Figure 19:
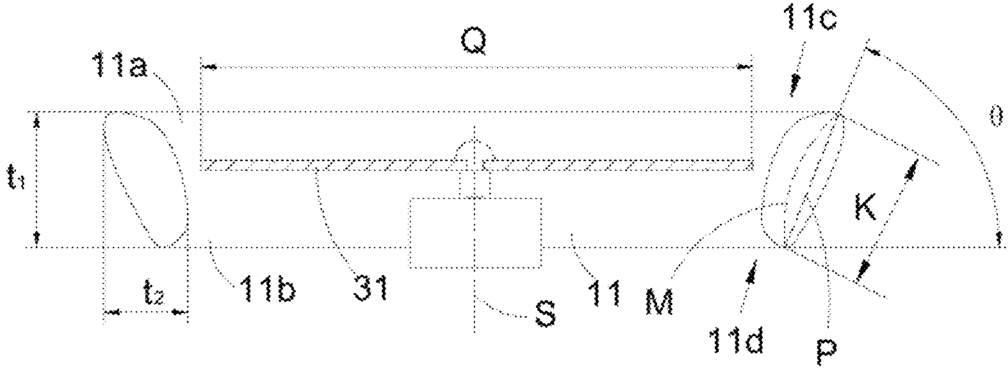
FIG. 19 is a schematic cross-sectional diagram of a duct unit provided by one embodiment of the present disclosure.

As shown in FIG. 19, in some embodiments, one duct unit 11 may have a central axis S. The longitudinal section of the duct unit 11 may be an airfoil, and the mid-arc line L of the airfoil may protrude toward the central axis S. The mid-arc line L may be defined as a line connecting the midpoints of the Y-direction height of the upper and lower surfaces of the airfoil, and in this embodiment, it may refer to a line connecting the midpoints of the inner and outer surfaces of the duct unit 11 in the thickness direction of the duct unit 11. In this embodiment, by setting the longitudinal section of the duct unit 11 to an airfoil, the front flow field and the rear flow field of the duct unit 11 may be effectively optimized, and the thrust of the duct 10 may be effectively increased.

As shown in FIG. 19, in some embodiments, the duct unit 11 may include a lip 11*a* and a diffusion port 11*b*, and the gas may enter the duct hole 111 from the lip 11*a* and diffuse out from the diffusion port 11*b*. The diameter of the lip 11*a* may gradually increase in the direction away from the diffusion port 11*b*. In this embodiment, the air intake area of the duct unit 11 may be first increased, and the airflow energy may be increased for the airflow acceleration of the lip 11*a*. Second, by setting the diameter of the lip 11*a* to gradually increase, a guiding effect may be formed for the duct unit 11, which may effectively prevent the gas from being separated instantly when it hits the duct unit 11 at the lip 11*a* affecting the efficiency and safety of the duct unit 11. It can be understood that, when the gas is separated when it hits the duct unit 11 at the lip 11*a*, the separated airflow will form a vortex airflow inside and outside the duct unit 11, which will affect the efficiency of the propellers and easily cause the vibration of the blades of the propellers, posing a safety hazard. Optionally, the surface of the lip 11*a* of the duct unit 11 may be a smooth transition surface.

As shown in FIG. 19, in some embodiments, the diameter of the diffusion port 11*b* may gradually increase in the direction away from the lip 11*a*. In this embodiment, a guiding effect may be formed on the rear flow field of the duct unit 11 to prevent the gas from generating a vortex airflow in the rear flow field of the duct unit 11.

In some embodiments, the diffusion angle of the lip 11*a* close to the vehicle body 20 may be smaller than the diffusion angle of the lip 11*a* away from the vehicle body 20. In some embodiments, the diffusion angle of the lip 11*a* close to the vehicle body 20 may be approximately zero.

As shown in FIG. 19, in some embodiments, the duct unit 11 may include an air inlet end 11*c* and an air outlet end 11*d*, and the outer diameter of the duct unit 11 may gradually decrease from the air inlet end 11*c* toward the air outlet end 11*d*. That is, the duct unit 11 may be roughly funnel-shaped from the air inlet end 11*c* to the air outlet end 11*d*. In this embodiment, the air intake of the duct unit 11 may be large, and the reduction of the diffusion port 11*b* may increase the outflow of the gas flowing out of the diffusion port 11*b*, thereby obtaining better thrust.

As shown in FIG. 19, in some embodiments, the power assembly 30 may include a propeller 31, and the distance between the inner wall of the duct hole 111 and the propeller 31 may be 0.75 mm±0.1 mm.

As shown in FIG. 19, in some embodiments, the distance between the top side and the bottom side of the duct unit 11 may be t1, where t1=13.34 mm±1 mm.

As shown in FIG. 19, in some embodiments, in the same longitudinal section of the duct unit 11, the distance between a position in the inner side of the duct unit 11 closest to the central axis and a position in the outer side of the duct unit 11 farthest to the central axis S may be t2, where t2=10.47 mm±1 mm.

As shown in FIG. 19, in some embodiments, the propeller 31 may rotate to form a propeller disk, and the diameter of the propeller disk may be Q, where Q=73.2 mm±7 mm.

As shown in FIG. 19, in some embodiments, the length of the chord P of the airfoil section of the duct unit 11 may be K, where K=14.95 mm±1.5 mm.

As shown in FIG. 19, in some embodiments, the angle between the chord P of the airfoil section of the ducted unit 11 and the horizontal plane may be θ, where θ=57.57°±5.7°.

Figure 20:
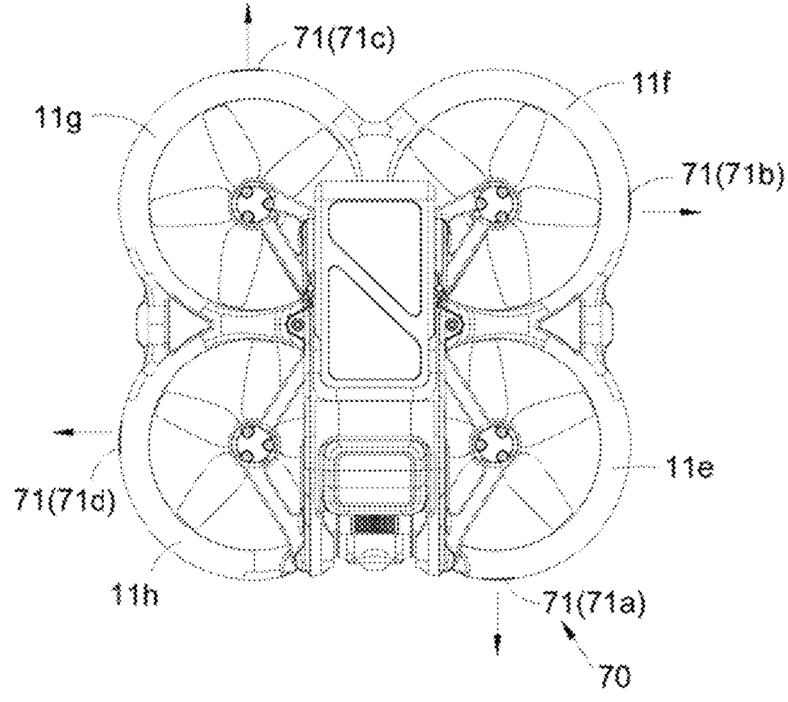
FIG. 20 is a schematic structural diagram of a ducted fan aerial vehicle from a second perspective provided by one embodiment of the present disclosure.

As shown in FIG. 20, in some embodiments, the ducted fan aerial vehicle 100 may further include an antenna assembly 70 arranged at the duct 10.

In some embodiments, the antenna assembly 70 may be entirely attached to the outer surface of the duct 10.

In some embodiments, the antenna assembly 70 may be arranged inside the duct 10. In this embodiment, the duct 10 may provide better protection for the antenna assembly 70.

As shown in FIG. 20, in some embodiments, the antenna assembly 70 may include at least two antennas 71, and at least two antennas 71 may be not parallel to each other.

As shown in FIG. 20, in some embodiments, the antenna assembly 70 may include four antennas 71, and the four antennas 71 may be distributed in the duct 10 in a manner that the maximum radiation directions of two adjacent antennas 71 are perpendicular to each other. In this embodiment, the antenna assembly 70 may approximately achieve a directional pattern coverage effect covering the entire space, and the signal connection may be stable.

As shown in FIG. 20, for example, the duct 10 may include four duct units 11, each of which is provided with one duct hole 111. One antenna 71 may be arranged on the outer side wall of each duct unit 11. For example, the four duct units 11 may be respectively a first duct unit 11*e*, a second duct unit 11*f*, a third duct unit 11*g*, and a fourth duct unit 11*h*. The first duct unit 11*e* may be located at the left front of the vehicle body 20, the second duct unit 11*f* may be located at the left rear of the vehicle body 20, the third duct unit 11*g* may be located at the right rear of the vehicle body 20, and the fourth duct unit 11*h* may be located at the right front of the vehicle body 20. The four antennas 71 may be respectively a first antenna 71*a*, a second antenna 71*b*, a third antenna 71*c* and a fourth antenna 71*d*. The first antenna 71*a* may be arranged on the outer wall of the first duct unit 11*e* and its maximum radiation direction may be toward the front side of the ducted fan aerial vehicle 100. The second antenna 71*b* may be arranged on the outer wall of the second duct unit 11*f* and its maximum radiation direction may be toward the left side of the ducted fan aerial vehicle 100. The third antenna 71*c* may be arranged on the outer wall of the third duct unit 11*g* and its maximum radiation direction may be toward the rear side of the ducted fan aerial vehicle 100. The fourth antenna 71*d* may be arranged on the outer wall of the fourth duct unit 11*h* and its maximum radiation direction may be toward the right side of the ducted fan aerial vehicle 100.

Figure 21:
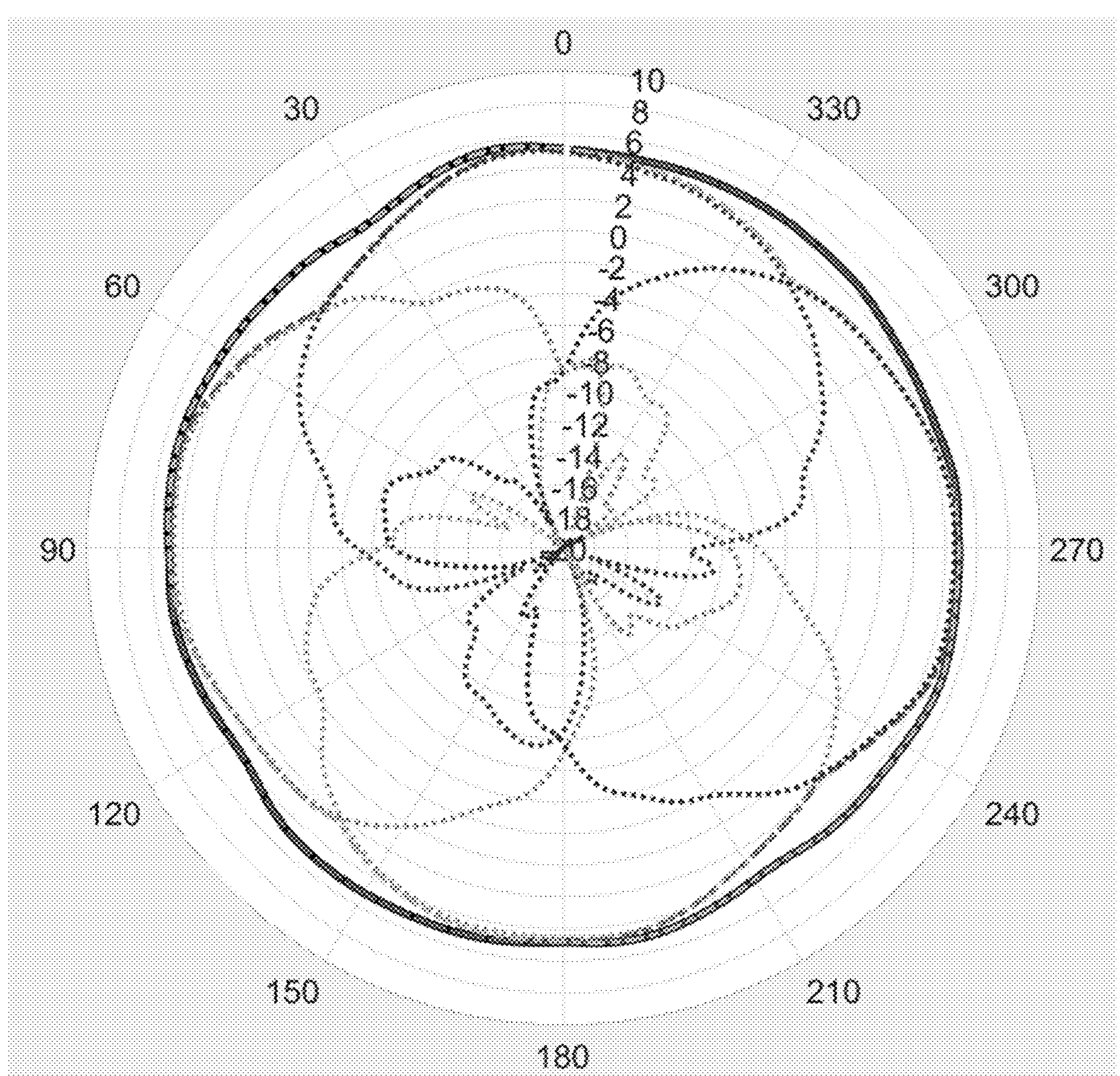
FIG. 21 is a two-dimensional directional radiation diagram of four antennas of a ducted fan aerial vehicle on the theta-90-degree plane of the vehicle body provided by one embodiment of the present disclosure.

As shown in FIG. 21, which is the 2D directional radiation pattern of the four antennas on the theta-90-degree plane of the vehicle body, the whole structure formed by the four antennas may achieve the coverage effect of the omnidirectional pattern on the theta-90-degree plane of the vehicle body.

Figure 22:
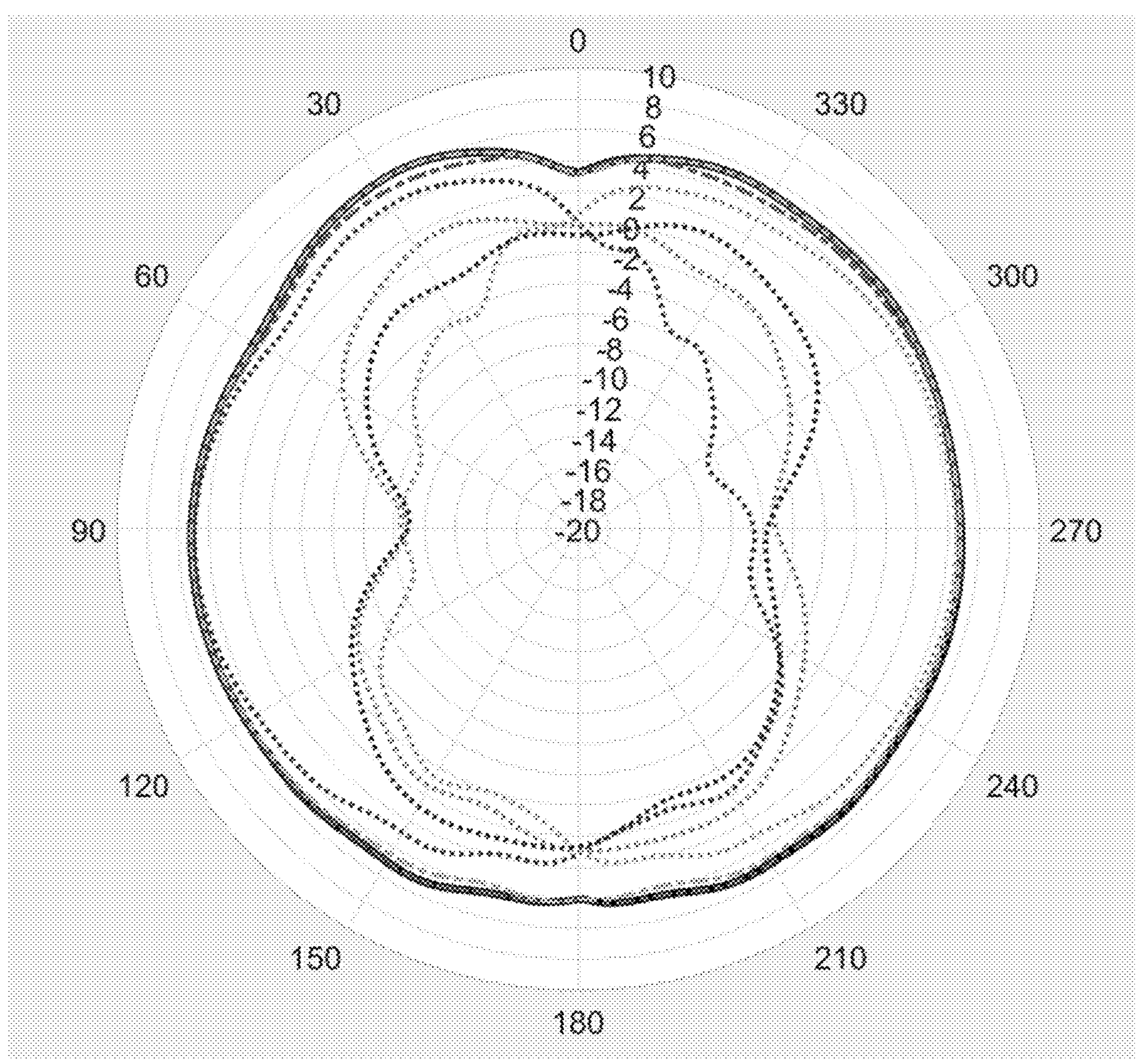
FIG. 22 is a two-dimensional directional radiation diagram of four antennas of a ducted fan aerial vehicle on the phi-O-degree plane of the vehicle body provided by one embodiment of the present disclosure.

As shown in FIG. 22, which is the 2D directional radiation pattern of the four antennas on the phi-O-degree plane of the vehicle body, the whole structure formed by the four antennas may achieve omnidirectional coverage on the phi-O-degree plane of the vehicle body.

Figure 23:
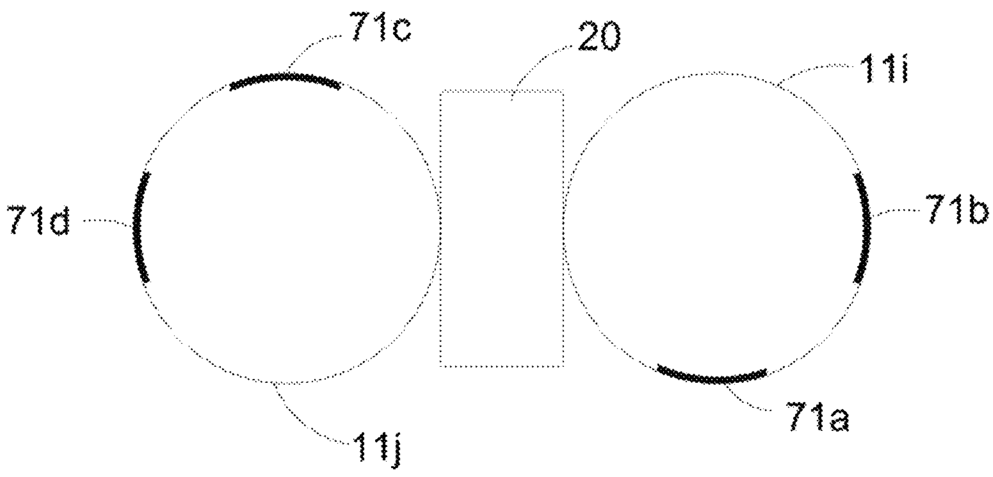
FIG. 23 is a schematic structural diagram of a ducted fan aerial vehicle provided by another embodiment of the present disclosure.

It should be noted that the duct 10 does not necessarily include four duct units 11 to achieve the distribution of four antennas 71 in the duct 10 in a manner that the maximum radiation directions of two adjacent antennas 71 are perpendicular to each other. For example, in some other embodiments, as shown in FIG. 23, the duct 10 may include two duct units 11, namely a left duct unit 11*i* arranged on the left side of the vehicle body 20 and a right duct unit 11*j* arranged on the right side of the vehicle body 20. The first antenna 71*a* may be arranged on the outer wall of the left duct unit 11*i* with the maximum radiation direction facing the front side of the ducted fan aerial vehicle 100, the second antenna 71*b* may be arranged on the outer wall of the left duct unit 11*i* with the maximum radiation direction facing the left side of the ducted fan aerial vehicle 100, the third antenna 71*c* may be arranged on the outer wall of the right duct unit 11*j* with the maximum radiation direction facing the rear side of the ducted fan aerial vehicle 100, and the fourth antenna 71*d* may be arranged on the outer wall of the right duct unit 11*j* with the maximum radiation direction facing the right side of the ducted fan aerial vehicle 100. That is, the setting of the maximum radiation direction of the four antennas 71 may not depend on the number of the duct units 11. In some other embodiments, the duct 10 may include six duct units 11 or eight duct units 11 or any other number of duct units 11, and it may be also possible to achieve that the four antennas 71 are distributed in the duct 10 in a manner such that the maximum radiation directions of two adjacent antennas 71 are perpendicular to each other.

In some embodiments, one antenna 71 may be a conformal microstrip patch antenna. Optionally, the antenna 71 may be formed on the duct 10 by in-mold injection molding or laser direct forming technology or laser chemical activation metal plating technology.

Figure 24:
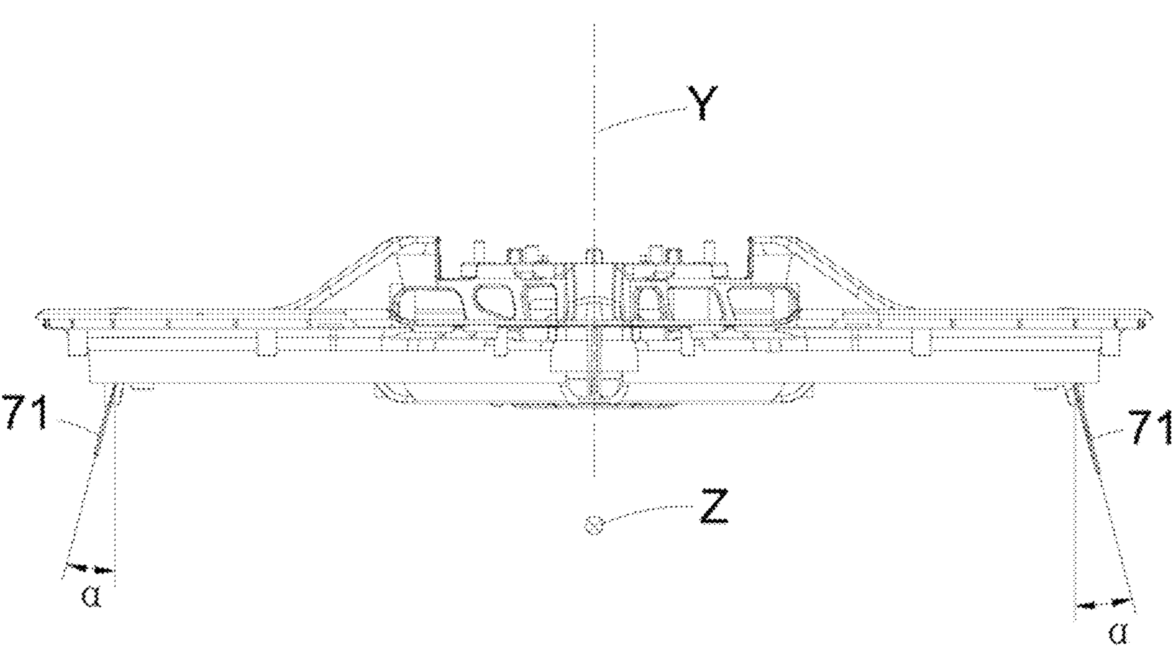
FIG. 24 is a schematic partial structural diagram of a duct along the roll axis direction provided by one embodiment of the present disclosure.

It should be noted that the antenna assembly 70 is not limited to the above arrangement. For example, as shown in FIG. 24, in some other embodiments, the antenna assembly 70 may include two antennas 71, and the two antennas 71 may be respectively arranged on opposite sides of the duct 10. Each antenna 71 may be arranged at an angle with the yaw axis Y of the ducted fan aerial vehicle 100. In this embodiment, compared with the existing arrangement of the antennas 71 parallel to the yaw axis Y of the ducted fan aerial vehicle 100, the arrangement of the antennas 71 at an angle with the yaw axis Y of the ducted fan aerial vehicle 100 may make the maximum radiation direction of the antennas 71 avoid the metal parts such as the vehicle body 20 or the battery of the ducted fan aerial vehicle 100, thereby achieving a better signal coverage effect.

As shown in FIG. 24, in some embodiments, the two antennas 71 may be arranged in a diverging or angled shape.

As shown in FIG. 24, in some embodiments, the angle between each antenna 71 and the yaw axis Y of the ducted fan aerial vehicle 100 may be $\alpha$, where $15 \leq \alpha \leq 30°$. In this embodiment, the antenna assembly 70 may achieve approximately full space coverage.

As shown in FIG. 24, in some embodiments, the two antennas 71 may be distributed on two sides of the roll axis Z of the ducted fan aerial vehicle 100.

As shown in FIG. 24, in some embodiments, the projections of the two antennas 71 in the roll axis Z direction of the ducted fan aerial vehicle 100 may be symmetrically arranged relative to the yaw axis Y of the ducted fan aerial vehicle 100.

Figure 25:
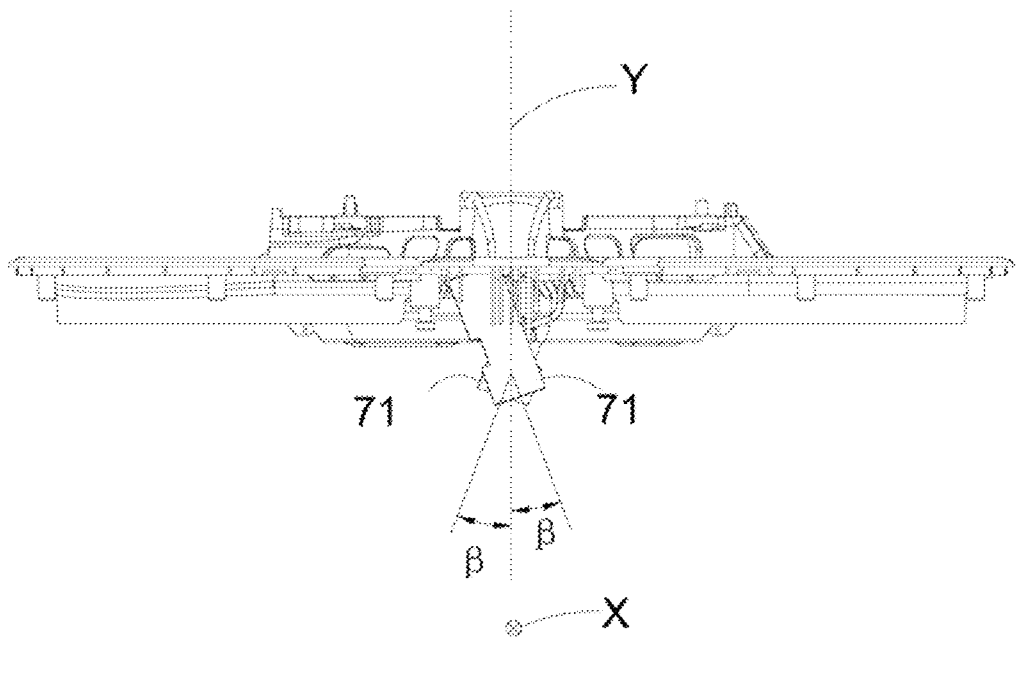
FIG. 25 is a schematic partial structural diagram of a duct along the pitch axis direction provided by one embodiment of the present disclosure.

As shown in FIG. 25, in some embodiments, the projections of the two antennas 71 in the pitch axis X direction of the ducted fan aerial vehicle 100 may be staggered. In this embodiment, the ducted fan aerial vehicle 100 may ensure that at least one antenna 71 has directional pattern coverage in different postures, thereby improving the stability of the wireless communication link of the ducted fan aerial vehicle 100.

As shown in FIG. 25, in some embodiments, the angle between the projections of the two antennas 71 in the direction of the pitch axis X of the ducted fan aerial vehicle 100 may be $\beta$, where $40° \leq \beta \leq 60°$.

As shown in FIG. 25, in some embodiments, the projections of the two antennas 71 in the direction of the pitch axis X of the ducted fan aerial vehicle 100 may be symmetrically arranged relative to the yaw axis Y of the ducted fan aerial vehicle 100.

In some embodiments, the duct 10 may include a top side and a bottom side. The vehicle body 20 may be mounted on the top side of the duct 10, and the two antennas 71 may be arranged on the bottom side of the duct 10.

In some embodiments, the antennas 71 may be accommodated inside the skid 15. In this embodiment, the antennas 71 may be accommodated inside the skid 15 and may be well protected by the skid 15.

In some embodiments, two skids 15 containing the antennas 71 may be arranged in a diverging or angled shape, and the angle between each skid 15 and the yaw axis Y of the ducted fan aerial vehicle 100 may be $\alpha$, where $15° \leq \alpha \leq 30°$. In this embodiment, on the one hand, the angle may be consistent with the inclination angle of the antennas 71, which facilitates the angle setting of the antennas 71. On the other hand, the skid 71 may be arranged at an angle, and when it hits the ground, part of the impact force may be dispersed to avoid the impact force being transmitted to the vehicle body 20 through the duct 10.

Figure 26:
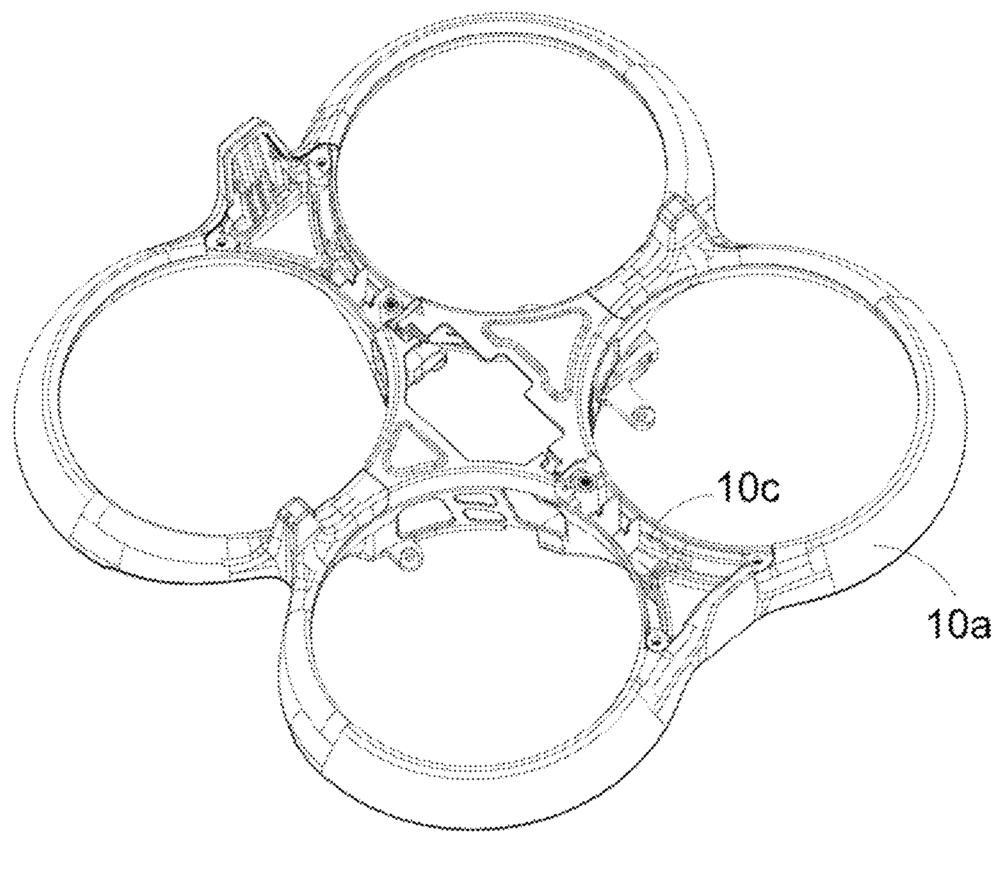
FIG. 26 is a schematic partial structural diagram of a duct provided by one embodiment of the present disclosure.
Figure 27:
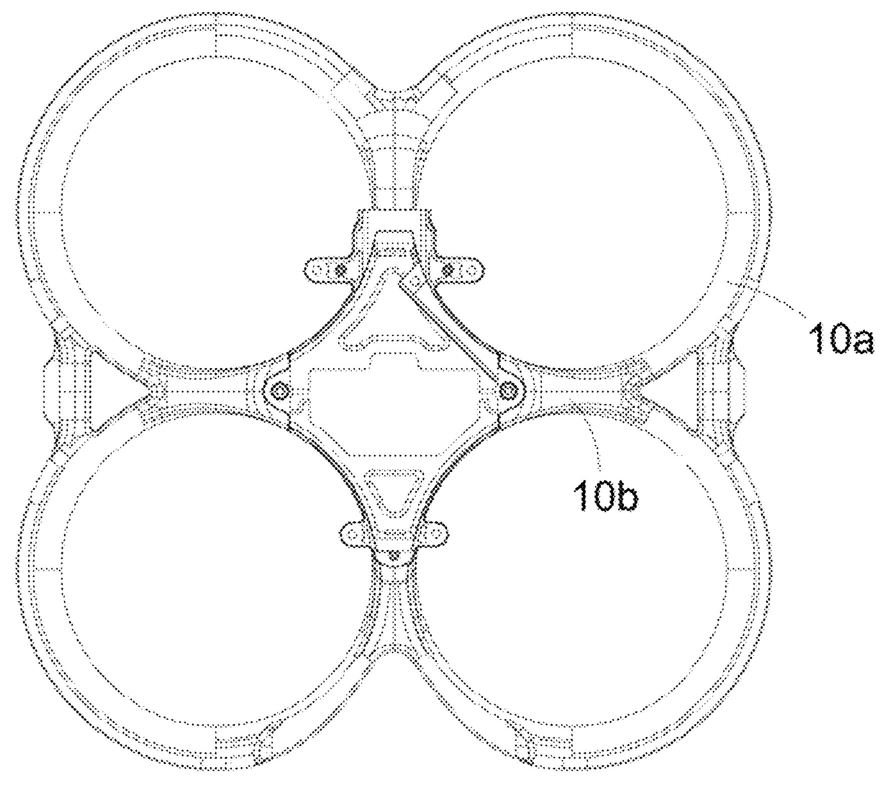
FIG. 27 is a schematic structural diagram of a duct provided by one embodiment of the present disclosure.

As shown in FIG. 26 and FIG. 27, in some embodiments, the duct 10 may include a duct body **10*a* and a cover plate 10*b*. The duct body 10*a* may be provided with an open wiring channel 10*c*, and the connection line between the vehicle body 20 and the antenna 71 may be arranged in the wiring channel 10*c*. The cover plate 10*b* may be detachably connected to the duct body 10*a*, and the cover plate 10*b* may be used to cover the opening. In this embodiment, the wiring between the vehicle body 20 and the antennas may be convenient. For example, when wiring, the cover plate 10*b* may be opened first, and after the wiring and routing between the vehicle body 20 and the antennas 71 are completed, the cover plate 10*b*** may be sealed at the opening, which is simple and convenient.

Figure 28:
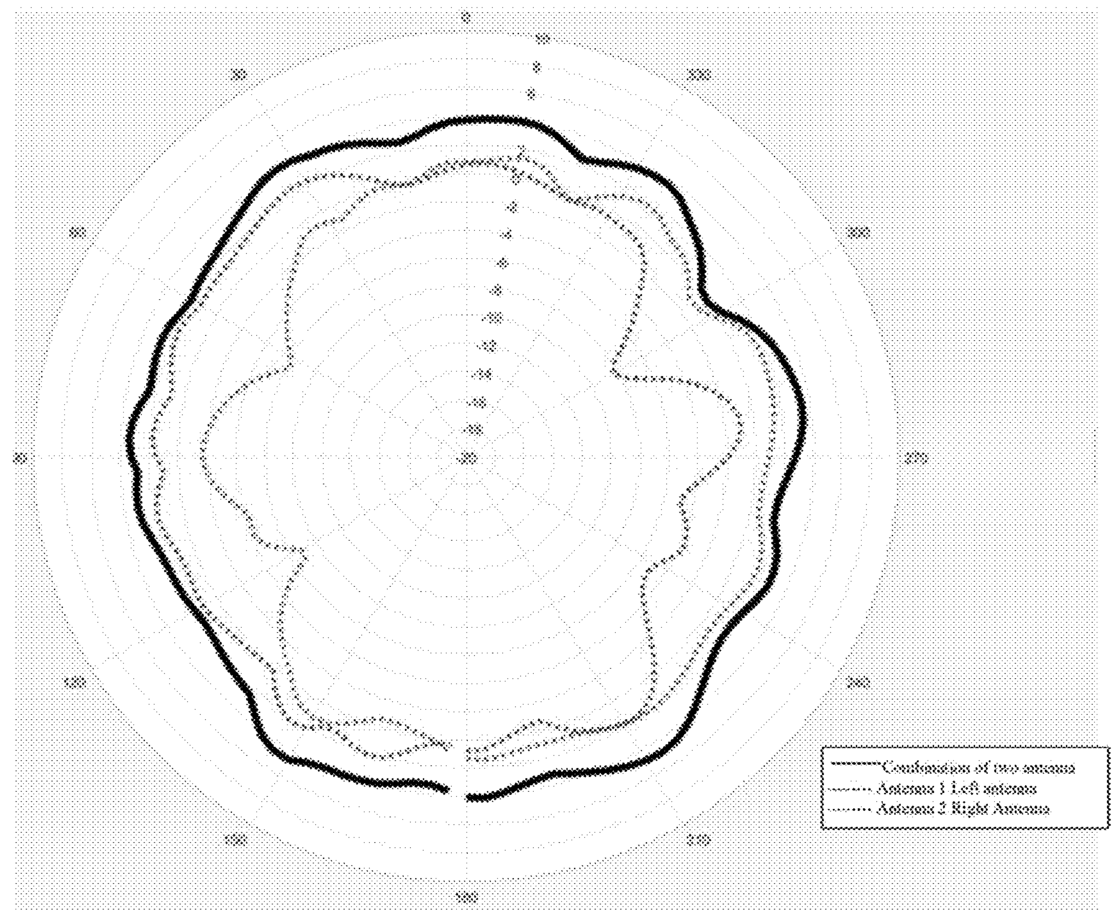
FIG. 28 is a two-dimensional directional radiation diagram of two antennas of a ducted fan aerial vehicle on the theta-90-degree plane of the vehicle body provided by one embodiment of the present disclosure.

As shown in FIG. 28 which is the 2D directional radiation pattern of the two antennas on the theta-90-degree surface of the vehicle body, the whole formed by the two antennas may achieve an omnidirectional coverage effect on the theta-90-degree surface of the vehicle body.

Figure 29:
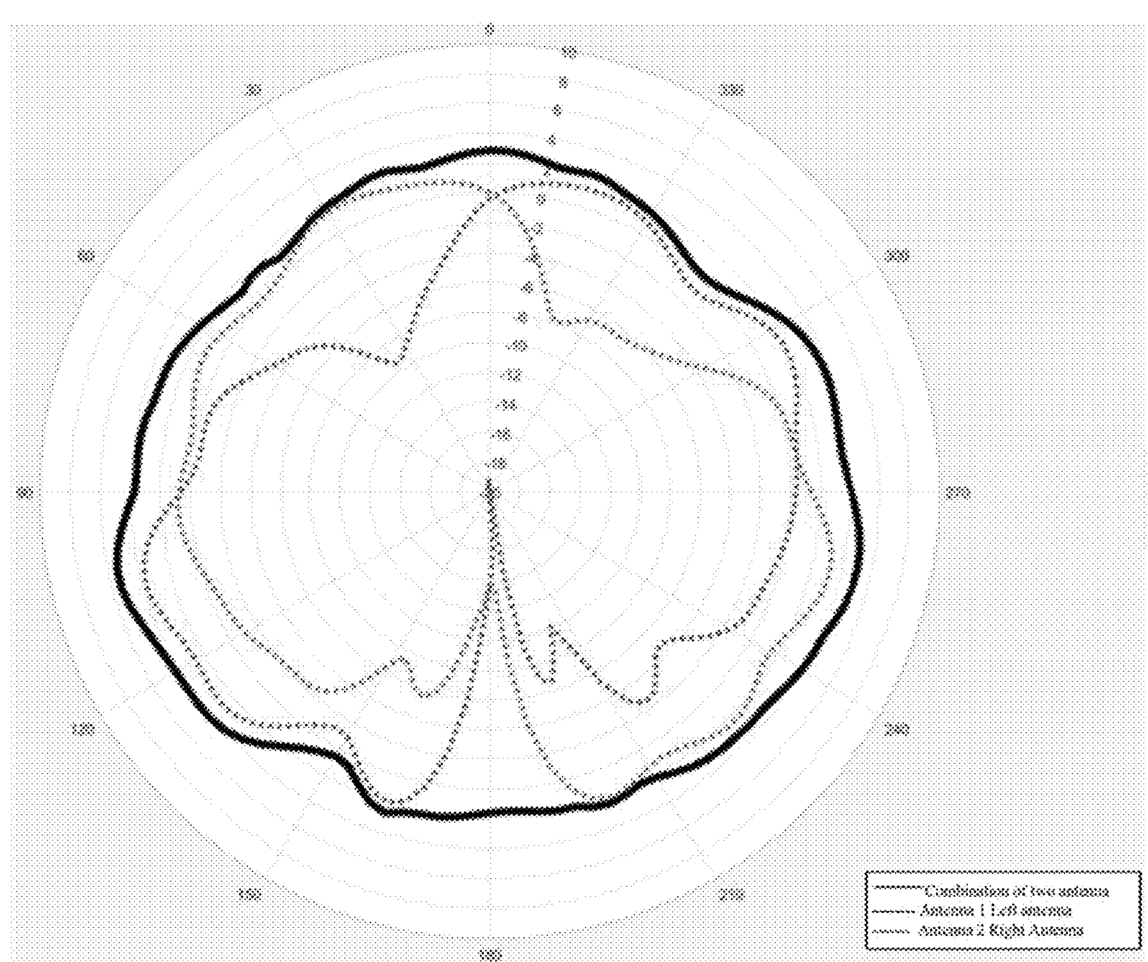
FIG. 29 is a two-dimensional directional radiation diagram of two antennas of a ducted fan aerial vehicle on the phi-O-degree plane of the vehicle body provided by one embodiment of the present disclosure.

As shown in FIG. 29 which is he 2D directional radiation pattern of the two antennas on the phi-O-degree surface of the vehicle body, the whole formed by the two antennas may achieve an omnidirectional coverage effect on the phi-O-degree surface of the vehicle body.

The present disclosure also provides a duct as shown in FIG. 1 to FIG. 29. The The duct 10 may include at least two duct units 11, and one duct units 11 may include one duct hole 111. The duct holes 111 may be used to accommodate a power assembly 30 of a ducted fan aerial vehicle 100. The duct 10 may be used to generate aerodynamic thrust together with the power assembly 30. At least part of the duct unit 11 may be a hollow structure.

In some embodiments, the duct 10 may include a first duct structure 12 and a second duct structure 13, and the first duct structure 12 and the second duct structure 13 may be assembled to form the duct 10.

In some embodiments, the at least two duct units 11 may form a surrounding distribution structure. Two adjacent duct units 11 may be connected to each other, and a first reinforcement structure 110 may be provided at the connection of the at least two duct units 11.

In some embodiments, the duct 10 may include a skid 15, and the first reinforcement structure 110 may be arranged close to the skid 15.

In some embodiments, the first reinforcement structure 110 may include a reinforcement rib 1101 and an embedding groove 1102. The reinforcement rib 1101 may be arranged at one of the first duct structure 12 and the second duct structure 13, and the embedding groove 1102 may be arranged at the other of the first duct structure 12 and the second duct structure 13. The reinforcement rib 1101 may be embedded in the embedding groove 1102.

In some embodiments, an adhesive may be arranged at the embedding groove 1102, and the reinforcement rib 1101 may be bonded and fixed to the inner side wall of the embedding groove 1102 by the adhesive.

In some embodiments, the first duct structure 12 may include at least two duct inner rings 121 which form the inner side wall of the duct units 11, and the second duct structure 13 may include at least two duct outer rings 131 which form the outer side wall of the duct unit 11. The duct inner rings 121 and the duct outer rings 131 may be assembled to form the duct units 11.

In some embodiments, at least two duct inner rings 121 may form a surrounding distribution structure, each duct inner ring 121 may be an annular closed structure, and the first duct structure 12 may further may include a second reinforcement structure 122 which may be located in the middle of the surrounding distribution structure and connected to the at least two duct inner rings 121.

In some embodiments, the second reinforcement structure 122 may be integrally formed with the duct inner rings 121, or the second reinforcement structure 122 may be detachably connected to the duct inner rings 121.

In some embodiments, the second reinforcement structure 122 may be provided with a hollow structure 1221.

In some embodiments, the second reinforcement structure 122 and the duct inner rings 121 may be enclosed to form a concave cavity 123, and the concave cavity 123 may be used to accommodate the avionics module and/or power module of the ducted fan aerial vehicle 100.

In some embodiments, the duct inner rings 121 may be provided with a vent 1211 connected to the concave cavity 123.

In some embodiments, at least two duct inner rings 121 may form a surrounding distribution structure, each duct inner ring 121 may be an annular closed structure, and the first duct structure 12 may further include a third reinforcement structure 124 which may be located at the edge of the surrounding distribution structure and connect the two adjacent duct inner rings 121.

In some embodiments, the duct 10 may include a skid 15, and the third reinforcement structure 124 may be provided at the skid 15.

In some embodiments, the third reinforcement structure 124 may be integrally formed with the duct inner rings 121, or the third reinforcement structure 124 may be detachably connected to the duct inner ring 121.

In some embodiments, at least two duct outer rings 131 may form a surrounding distribution structure, each duct outer ring 131 may be an arc structure, and the ends of two adjacent duct outer rings 131 may be connected to each other.

In some embodiments, the duct 10 may include a skid 15, and the skid 15 may be provided at the connection of two adjacent duct outer rings 131.

In some embodiments, the skid 15 may be integrally formed with the duct outer rings 131.

In some embodiments, one of one duct inner ring 121 and one duct outer ring 131 may be provided with an assembly groove 101, and the other one of the duct inner ring 121 and the duct outer ring 131 may be provided with an assembly member 102. The assembly member 102 may be embedded in the assembly groove 101.

In some embodiments, an adhesive may be provided in the assembly groove 101, and the assembly member 102 may be bonded and fixed to the inner side wall of the assembly groove 101 by the adhesive.

In some embodiments, the assembly member 102 may be provided with a positioning boss 1021 on one or two sides of the thickness direction thereof.

In some embodiments, one duct inner ring 121 may include a first edge 121*a* and a second edge 121*b* opposite to the first edge 121*a*, and the duct outer ring 131 may include a third edge 131*a* and a fourth edge 131*b* opposite to the third edge 131*a*. The first edge 121*a* may be abutted with the third edge 131*a*, and the second edge 121*b* may be abutted with the fourth edge 131*b*, where the matching structure of the assembly groove 101 and the assembly member 102 may be provided near the first edge 121*a* and the third edge 131*a*, and near the second edge 121*b* and the fourth edge 131*b*.

In some embodiments, one of the duct inner ring 121 and the duct outer ring 131 may be provided with a guide hole 103, and the other of the duct inner ring 121 and the duct outer ring 131 may be provided with a guide column 104, and the guide column 104 may be inserted in the guide hole 103.

In some embodiments, one of the duct inner ring 121 and the duct outer ring 131 may be provided with a first snap member 105, and the other of the duct inner ring 121 and the duct outer ring 131 may be provided with a second snap member 106, and the first snap member 105 may be snap-connected with the second snap member 106.

In some embodiments, the duct 10 may be provided with first positioning members 14, and the first positioning members 14 may be used to cooperate with the second positioning member of the vehicle body 20 of the ducted fan aerial vehicle 100, such that the vehicle body 20 of the ducted fan aerial vehicle 100 may be positioned and installed at the duct 10.

In some embodiments, the number of the first positioning members 14 may be three, and the three first positioning members 14 may be arranged in a triangular shape on the duct 10.

In some embodiments, the first duct structure 12 and the second duct structure 13 may be both hard parts.

In some embodiments, the duct inner rings 121 and the duct outer rings 131 may be both plastic parts.

In some embodiments, one duct unit 11 may have a central axis S, and the longitudinal cross-section of the duct unit 11 may be an airfoil, and the mid-arc line L of the airfoil may protrude toward the central axis S.

In some embodiments, the duct unit 11 may include a lip 11*a* and a diffusion port 11*b*, and the gas may enter the duct hole 111 from the lip 11*a* and diffuse out from the diffusion port 11*b*. The diameter of the lip 11*a* may gradually increase in the direction away from the diffusion port 11*b*.

In some embodiments, the diameter of the diffusion port 11*b* may gradually increase in the direction away from the lip 11*a*.

In some embodiments, the diffusion angle of the lip 11*a* close to the vehicle body 20 may be less than the diffusion angle of the lip 11*a* away from the vehicle body 20.

In some embodiments, the diffusion angle of the lip 11*a* close to the vehicle body 20 may be approximately zero.

In some embodiments, the duct unit 11 may include an air inlet end 11*c* and an air outlet end 11*d*, and the outer diameter of the duct unit 11 may gradually decrease from the air inlet end 11*c* toward the air outlet end 11*d*.

In some embodiments, the power assembly 30 may include a propeller 31, and the distance between the inner wall of the duct hole 111 and the propeller 31 may be 0.75 mm+0.1 mm.

In some embodiments, the duct 10 may be provided with an antenna assembly 70.

In some embodiments, the antenna assembly 70 may be arranged in the duct 10, or the antenna assembly 70 may be attached to the outer wall of the duct 10.

In some embodiments, the antenna assembly 70 may include at least two antennas 71, and the at least two antennas 71 may be not parallel to each other.

In some embodiments, the antenna assembly 70 may include four antennas 71, and the four antennas 71 may be distributed in the duct 10 in a manner that the maximum radiation directions of two adjacent antennas 71 may be perpendicular.

In some embodiments, one antenna 71 may be a conformal microstrip patch antenna 71.

In some embodiments, the antennas 71 may be formed in the duct 10 by in-mold injection molding or laser direct molding technology or laser chemical activation metal plating technology.

In some embodiments, the duct 10 may include four duct units 11, the duct units 11 may be provided with duct holes 111, and one antenna 71 may be arranged on the outer wall of each duct unit 11.

In some embodiments, the antenna assembly 70 may include two antennas 71, which may be respectively arranged on opposite sides of the duct 10, and each antenna 71 may be arranged at an angle with the yaw axis Y of the ducted fan aerial vehicle 100.

In some embodiments, the two antennas 71 may be arranged in a diverging or angled shape.

In some embodiments, the duct 10 may include a top side and a bottom side, the vehicle body 20 may be installed at the top side of the duct 10, and the two antennas 71 may be arranged on the bottom side of the duct 10.

In some embodiments, a skid 15 may be provided at the bottom side of the duct 10, and the antenna 71 may be accommodated inside the skid 15.

In some embodiments, the duct 10 may include a duct body 10*a* and a cover plate 10*b*, the duct body 10*a* may be provided with an open wiring channel 10*c*, the connection line between the vehicle body 20 and the antenna 71 may be arranged in the wiring channel 10*c*, the cover plate 10*b* may be detachably connected to the duct body 10*a*, and the cover plate 10*b* may be used to cover the opening.

In some embodiments, the angle between each antenna 71 and the yaw axis Y of the duct 10 may be $\alpha$, where $15 \leq \alpha \leq 30°$.

In some embodiments, the two antennas 71 may be distributed on two sides of the roll axis Z of the ducted fan aerial vehicle 100.

In some embodiments, the projections of the two antennas 71 in the roll axis Z direction of the ducted fan aerial vehicle 10 may be symmetrically arranged relative to the yaw axis Y of the ducted fan aerial vehicle 100.

In some embodiments, the projections of the two antennas 71 in the pitch axis X direction of the ducted fan aerial vehicle 10 may be staggered.

In some embodiments, the angle between the projections of the two antennas 71 in the pitch axis X direction of the ducted fan aerial vehicle 10 may be $\beta$, where $40° \leq \beta \leq 60°$.

In some embodiments, the projections of the two antennas 71 in the pitch axis X direction of the ducted fan aerial vehicle 100 may be symmetrically arranged relative to the yaw axis Y of the ducted fan aerial vehicle 100.

Various embodiments have been described to illustrate the operation principles and exemplary implementations. Those skilled in the art would understand that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. A ducted fan aerial vehicle comprising:

a duct including a duct unit, the duct unit including a duct hole, at least part of the duct unit being a hollow structure, the duct defining, for each duct hole, a plane of an upper opening;

a vehicle body connected to the duct, the vehicle body protruding above the plane of the upper opening of each duct hole, wherein, in a top view, the vehicle body is substantially rectangular, and a length of the vehicle body is greater than a diameter of each duct hole; and a power assembly connected to the vehicle body and at least partially located in the duct hole, the power assembly being configured to cooperate with the duct to provide aerodynamic thrust.

2. The ducted fan aerial vehicle according to claim 1, wherein the duct includes a first duct structure and a second duct structure assembled to form the duct.

3. The ducted fan aerial vehicle according to claim 2, wherein:

the duct unit is one of at least two duct units of the duct that form a surrounding distribution structure;

two adjacent ones of the at least two duct units are connected to each other; and a reinforcement structure is provided at a connection between two of the at least two duct units.

4. The ducted fan aerial vehicle according to claim 3, wherein:

the duct includes a skid, and the reinforcement structure is arranged close to the skid; and/or the reinforcement structure includes:

a reinforcement rib provided in one of the first duct structure and the second duct structure; and an embedding groove provided in another one of the first duct structure and the second duct structure, the reinforcement rib being embedded in the embedding groove.

5. The ducted fan aerial vehicle according to claim 2, wherein:

the first duct structure includes at least two duct inner rings respectively forming inner walls of corresponding duct units;

the second duct structure includes at least two duct outer rings respectively forming outer walls of corresponding duct units; and the at least two duct inner rings and the at least two duct outer rings are assembled to form at least two duct units.

6. The ducted fan aerial vehicle according to claim 5, wherein:

the at least two duct inner rings form a surrounding distribution structure, and each of the at least two duct inner rings is an annular closed structure; and the first duct structure further includes a reinforcement structure located in a middle of the surrounding distribution structure and connected to the at least two duct inner rings.

7. The ducted fan aerial vehicle according to claim 6, wherein the ducted fan aerial vehicle satisfies at least one of following:

the reinforcement structure is integrally formed with or detachably connected to the at least two duct inner rings;

the reinforcement structure has a hollow structure; or the reinforcement structure and the at least two duct inner rings are enclosed to form a concave cavity, and the concave cavity is used to accommodate at least one of an avionics module or a power module of the ducted fan aerial vehicle.

8. The ducted fan aerial vehicle according to claim 5, wherein:

the at least two duct inner rings form a surrounding distribution structure, and each of the at least two duct inner rings is an annular closed structure; and the first duct structure further includes a reinforcement structure located at an edge of the surrounding distribution structure and connected to two adjacent ones of the at least two duct inner rings.

9. The ducted fan aerial vehicle according to claim 8, wherein:

the duct includes a skid, and the reinforcement structure is arranged at the skid; and/or the reinforcement structure is integrally formed with or detachably connected to the at least two duct inner rings.

10. The ducted fan aerial vehicle according to claim 5, wherein the ducted fan aerial vehicle satisfies at least one of following:

the at least two duct outer rings form a surrounding distribution structure, each of the duct outer rings is an arc structure, and ends of two adjacent duct outer rings are connected to each other;

one of one duct inner ring and one corresponding duct outer ring is provided with an assembly groove, and another one of the one duct inner ring and the one duct outer ring is provided with an assembly member embedded in the assembly groove;

one of one duct inner ring and one corresponding duct outer ring is provided with a guide hole, and another one of the one duct inner ring and the one corresponding duct outer ring is provided with a guide column inserted in the guide hole; or one of one duct inner ring and one corresponding duct outer ring is provided with a first snap member, and another one of the one duct inner ring and the one corresponding duct outer ring is provided with a second snap member snapped with the first snap member.

11. The ducted fan aerial vehicle according to claim 1, wherein the duct is provided with a first positioning member, the vehicle body is provided with a second positioning member, and the vehicle body is installed at the duct through cooperation and positioning of the first positioning member and the second positioning member.

12. The ducted fan aerial vehicle according to claim 1, further comprising:

a shock absorption mechanism connected to the vehicle body;

a gimbal connected to the shock absorption mechanism; and a camera device connected to the gimbal;

wherein the shock absorption mechanism is located below the camera device.

13. The ducted fan aerial vehicle according to claim 12, wherein:

the shock absorption mechanism includes a connection member connected to the gimbal and a shock absorption member connecting the connection member and the vehicle body; and the gimbal includes:

a gimbal bracket integrally formed with the connection member; and a motor installed at the gimbal bracket and connected to the camera device.

14. The ducted fan aerial vehicle according to claim 13, wherein:

the gimbal bracket is tilted at a preset angle relative to the connection member to avoid blocking a field of view of the camera device; and/or the motor is configured to drive the camera device to perform a pitch movement, and an avoidance gap is provided at a side of the connection member facing a forward direction of the ducted fan aerial vehicle, the avoidance gap allowing the connection member to avoid the field of view of the camera device when the camera device looks down at an extreme position, to avoid blocking the field of view of the camera device.

15. The ducted fan aerial vehicle according to claim 1, wherein:

the vehicle body includes:

a vehicle main body; and an arm connecting the vehicle main body and the power assembly, the arm including a first support arm and a second support arm extending outward from the vehicle main body and connected such that the first support arm, the second support arm, and a portion of the vehicle main body together form a triangle; and the power assembly is installed at a connection between the first support arm and the second support arm.

16. The ducted fan aerial vehicle according to claim 1, wherein the ducted fan aerial vehicle satisfies at least one of following:

a longitudinal section of the duct unit is an airfoil, and a center arc line of the airfoil protrudes toward a central axis of the duct unit;

the duct unit includes a lip and a diffusion port, and a diameter of the lip gradually increases in a direction away from the diffusion port;

the duct unit includes an air inlet end and an air outlet end, and an outer diameter of the duct unit gradually decreases from the air inlet end toward the air outlet end; or the power assembly includes a propeller, and a distance between an inner wall of the duct hole and the propeller is 0.75 mm±0.1 mm.

17. The ducted fan aerial vehicle according to claim 1, further comprising:

an antenna assembly arranged at the duct.

18. The ducted fan aerial vehicle according to claim 17, wherein:

the antenna assembly is arranged inside the duct or attached to an outer wall of the duct; and/or the antenna assembly includes at least two antennas not parallel to each other.

19. The ducted fan aerial vehicle according to claim 17, wherein the ducted fan aerial vehicle satisfies at least one of following:

the antenna assembly includes four antennas distributed in the duct in a manner such that maximum radiation directions of two adjacent ones of the four antennas are perpendicular to each other; or the antenna assembly includes two antennas arranged at two opposite sides of the duct, and each at an angle with respect to a yaw axis of the ducted fan aerial vehicle.

20. The ducted fan aerial vehicle according to claim 19, wherein:

the ducted fan aerial vehicle satisfies at least one of following:

each of the antennas is a conformal microstrip patch antenna;

each of the antennas is formed in the duct by using in-mold injection molding, laser direct molding technology, or laser chemical activation metal plating technology;

the duct unit is one of four duct units of the duct, each provided with one duct hole, and each of the antennas is arranged on an outer side wall of one of the four duct units; and/or the ducted fan aerial vehicle satisfies at least one of following:

the two antennas are arranged in a diverging or angled shape;

the duct includes a top side and a bottom side, the vehicle body being installed at the top side of the duct and the two antennas are arranged on the bottom side of the duct;

the two antennas are distributed on two sides of a roll axis of the ducted fan aerial vehicle;

projections of the two antennas in a direction of an axis of the ducted fan aerial vehicle are symmetrically arranged with respect to the axis of the ducted fan aerial vehicle, the axis being any of a roll axis, a yaw axis, and a pitch axis;

an included angle $\alpha$ between each antenna and the yaw axis of the ducted fan aerial vehicle satisfies $15° \leq \alpha \leq 30°$; or an included angle $\beta$ of projections of the two antennas in a pitch axis direction of the ducted fan aerial vehicle satisfies $40° \leq \beta \leq 60°$.

* * * * *